United States Patent
Sun

(10) Patent No.: US 12,529,700 B2
(45) Date of Patent: Jan. 20, 2026

(54) METHODS FOR IDENTIFYING CANCER

(71) Applicant: NDSU Research Foundation, Fargo, ND (US)

(72) Inventor: Dali Sun, West Fargo, ND (US)

(73) Assignee: NDSU RESEARCH FOUNDATION, Fargo, ND (US)

( * ) Notice: Subject to any disclaimer, the term of this patent is extended or adjusted under 35 U.S.C. 154(b) by 625 days.

(21) Appl. No.: 17/735,253

(22) Filed: May 3, 2022

(65) Prior Publication Data
US 2022/0349891 A1  Nov. 3, 2022

Related U.S. Application Data

(60) Provisional application No. 63/183,262, filed on May 3, 2021.

(51) Int. Cl.
*G01N 33/574* (2006.01)
*G01N 15/01* (2024.01)
*G01N 15/1434* (2024.01)
*G01N 15/10* (2024.01)

(52) U.S. Cl.
CPC ... *G01N 33/57484* (2013.01); *G01N 15/1434* (2013.01); *G01N 15/01* (2024.01); *G01N 2015/1006* (2013.01); *G01N 2333/705* (2013.01)

(58) Field of Classification Search
None
See application file for complete search history.

(56) References Cited

U.S. PATENT DOCUMENTS

| | | | |
|---|---|---|---|
| 2016/0298200 A1* | 10/2016 | Nazarenko | C12Q 1/6886 |
| 2023/0123746 A1* | 4/2023 | Im | G01N 21/648 |
| | | | 356/301 |
| 2023/0273211 A1* | 8/2023 | Lev | G01N 33/57415 |
| | | | 436/64 |
| 2023/0349887 A1* | 11/2023 | Millman | G01N 33/5308 |
| 2024/0210399 A1* | 6/2024 | Oberoi | G01N 33/56983 |
| 2024/0218368 A1* | 7/2024 | Kim | A61K 9/5063 |

OTHER PUBLICATIONS

Hironobu Naiki, Keiichi Higuchi, Masanori Hosokawa, Toshio Takeda, Fluorometric determination of amyloid fibrils in vitro using the fluorescent dye, thioflavine T, Analytical Biochemistry, vol. 177, Issue 2,1989, pp. 244-249, ISSN 0003-2697, https://doi.org/10.1016/0003-2697(89)90046-8. (Year: 1989).*

(Continued)

*Primary Examiner* — Rebecca M Giere
*Assistant Examiner* — Alexander Alexandrovic Volkov
(74) *Attorney, Agent, or Firm* — Mueting Raasch Group

(57) ABSTRACT

Provided are methods for identifying tumor-derived extracellular vesicles. The methods can include combining an antibody and a sample under conditions suitable for formation of antigen-antibody complexes with tumor-derived extracellular vesicles. The methods also include exposing the tumor-derived extracellular vesicles to a compound that binds beta-sheet structures, and determining if there is a change in binding of the compound to the extracellular vesicles compared to one or more controls.

20 Claims, 24 Drawing Sheets

(56) References Cited

OTHER PUBLICATIONS

Klunk WE, Pettegrew JW, Abraham DJ. Quantitative evaluation of congo red binding to amyloid-like proteins with a beta-pleated sheet conformation. J Histochem Cytochem. Aug. 1989;37(8):1273-81. doi: 10.1177/37.8.2666510. PMID: 2666510. (Year: 1989).*
Ozawa, P.M.M., Alkhilaiwi, F., Cavalli, I.J et al. Extracellular vesicles from triple-negative breast cancer cells promote proliferation and drug resistance in non-tumorigenic breast cells. Breast Cancer Res Treat 172, 713-723 (2018). https://doi.org/10.1007/s10549-018-4925-5 (Year: 2018).*
Xu et al. Thioflavin T as an efficient fluorescence sensor for selective recognition of RNA G-quadruplexes. Sci Rep. Apr. 21, 2016;6:24793. (Year: 2016).*
Verma et al. Beyond amyloid proteins: Thioflavin T in nucleic acid recognition. Biochimie. Nov. 2021;190:111-123 (Year: 2021).*
Elzanowska et al. DNA in extracellular vesicles: biological and clinical aspects. Mol Oncol. Jun. 2021;15(6):1701-1714. (Year: 2021).*
Wikipedia—Student's t-test (Year: 2025).*
Andre, F. et al. Malignant effusions and immunogenic tumour-derived exosomes. Lancet 360, 295-305 (2002).
Azmi, A. S., Bao, B. & Sarkar, F. H. Exosomes in cancer development, metastasis, and drug resistance: a comprehensive review. Cancer Metastasis Rev. 32, 623-642 (2013).
Boonstra et al. Selecting Targets for Tumor Imaging: an Overview of Cancer-Associated Membrane Proteins. *Biomarkers in Cancer* 2016:8 119-133 doi:10.4137/BIC.S38542.
Camussi, G., Deregibus, M. C., Bruno, S., Cantaluppi, V. & Biancone, L. Exosomes/microvesicles as a mechanism of cell-to-cell communication. Kidney Int. 78, 838-848 (2010).
Carew, J. S. & Huang, P. Mitochondrial defects in cancer. Mol. Cancer 1, 1-12 (2002).
Chan, C. X. J., Joseph, I. G., Huang, A., Jackson, D. N. & Lipke, P. N. Quantitative analyses of force-induced amyloid formation in Candida albicans Als5p: Activation by standard laboratory procedures. PLoS One 10, 1-13 (2015).
Costa-Silva, B. et al. Pancreatic cancer exosomes initiate pre-metastatic niche formation in the liver. Nat. Cell Biol. 17, 816-826 (2015).
Denzer, K., Kleijmeer, M. J., Heijnen, H. F., Stoorvogel, W. & Geuze, H. J. Exosome: from internal vesicle of the multivesicular body to intercellular signaling device. J. Cell Sci. 113 Pt 19, 3365-3374 (2000).
Distler, M., Pilarsky, E., Kersting, S. & Grützmann, R. Preoperative CEA and CA 19-9 are prognostic markers for survival after curative resection for ductal adenocarcinoma of the pancreas—a retrospective tumor marker prognostic study. Int. J. Surg. 11, 1067-1072 (2013).
Fadaka, A. et al. Biology of glucose metabolization in cancer cells. J. Oncol. Sci. 3, 45-51 (2017).
Greenfield, N. J. Using circular dichroism spectra to estimate protein secondary structure. Nat Protoc. 1, 2876-2890 (2006).
Hannafon, B. N. & Ding, W.-Q. Cancer stem cells and exosome signaling. Stem cell Investig. 2, 11 (2015).
Hess, V. et al. CA 19-9 tumour-marker response to chemotherapy in patients with advanced pancreatic cancer enrolled in a randomised controlled trial. Lancet Oncol. (2008). doi:10.1016/S1470-2045(08)70001-9.
Hurwitz, S. N. et al. Proteomic profiling of NCI-60 extracellular vesicles uncovers common protein cargo and cancer type-specific biomarkers. Oncotarget 7, 86999-87015 (2016).
Im, H. et al. Label-free detection and molecular profiling of exosomes with a nano-plasmonic sensor. Nat. Biotechnol. 32, 490-5 (2014).
Kosti, I., Jain, N., Aran, D., Butte, A. J. & Sirota, M. Cross-tissue Analysis of Gene and Protein Expression in Normal and Cancer Tissues. Sci. Rep. 6, 1-16 (2016).

Krafft, C. et al. A specific spectral signature of serum and plasma-derived extracellular vesicles for cancer screening. Nanomedicine Nanotechnology, Biol. Med. 13, 835-841 (2017).
Lange, H. et al. The RNA Helicases AtMTR4 and HEN2 Target Specific Subsets of Nuclear Transcripts for Degradation by the Nuclear Exosome in *Arabidopsis thaliana*. PLoS Genet. 10, e1004564 (2014).
Li, A., Zhang, T., Zheng, M., Liu, Y. & Chen, Z. Exosomal proteins as potential markers of tumor diagnosis. J. Hematol. Oncol. 10, 1-9 (2017).
Li, P., Kaslan, M., Lee, S. H., Yao, J. & Gao, Z. Progress in Exosome Isolation Techniques. Theranostics 7, (2017).
Litvinov et al. Ep-CAM: a Human Epithelial Antigen is a Homophilic Cell-Cell Adhesion Molecule. Journal of Cell Biol 1994:125(2) 437-446.
Lubas, M. et al. The Human Nuclear Exosome Targeting Complex Is Loaded onto Newly Synthesized RNA to Direct Early Ribonucleolysis. Cell Rep. 10, 178-192 (2015).
Maetzel, D. et al. Nuclear signalling by tumour-associated antigen EpCAM. Nat. Cell Biol. (2009). doi:10.1038/ncb1824.
Mallik, S., Jayashree, B. S. & Shenoy, R. R. Epigenetic modulation of macrophage polarization—perspectives in diabetic wounds. Journal of Diabetes and its Complications 32, 524-530 (2018).
Marrelli, D. et al. CA19-9 serum levels in obstructive jaundice: clinical value in benign and malignant conditions. Am. J. Surg. 198, 333-339 (2009).
Martz, E. Introduction to proteins-structure, function, and motion. Biochem. Mol. Biol. Educ. (2012). vol. 40, No. 3, pp. 218, doi:10.1002/bmb.20603.
Masyuk, A. I., Masyuk, T. V. & Larusso, N. F. Exosomes in the pathogenesis, diagnostics and therapeutics of liver diseases. J. Hepatol. 59, 621-625 (2013).
McGuire, A., Brown, J. A. L. & Kerin, M. J. Metastatic breast cancer: the potential of miRNA for diagnosis and treatment monitoring. Cancer Metastasis Rev. 34, 145-155 (2015).
Mihály, J. et al. Characterization of extracellular vesicles by IR spectroscopy: Fast and simple classification based on amide and C-H stretching vibrations. Biochim. Biophys. Acta-Biomembr. 1859, 459-466 (2017).
Miles, A. J. & Wallace, B. A. Chem Soc Rev Circular dichroism spectroscopy of membrane proteins. Chem Soc Rev 4859-4872 (2016). doi:10.1039/c5cs00084j.
Miles, A. J. & Wallace, B. A. Biopharmaceutical applications of protein characterization by circular dichroism spectroscopy. 123-152 (2020).
Nagy, G., Hoffmann, S., Jones, N. & Grubmuller, H. Sesca: Predicting the Circular Dichroism Spectra of Proteins from Molecular Structure. bioRxiv 279752 (2018). doi:10.1101/279752.
Nazimek, K. et al. Macrophages play an essential role in antigen-specific immune suppression mediated by t cd8+ cell-derived exosomes. Immunology n/a-n/a (2015). doi:10.1111/imm.12466.
Passarella, D. & Goedert, M. Beta-sheet assembly of Tau and neurodegeneration in *Drosophila melanogaster*. Neurobiol. Aging 72, 98-105 (2018).
Poruk, K. et al. The Clinical Utility of CA 19-9 in Pancreatic Adenocarcinoma: Diagnostic and Prognostic Updates. Curr. Mol. Med. 13, 340-351 (2013).
Qin, X. L. et al. Utility of serum CA19-9 in diagnosis of cholangiocarcinoma: In comparison with CEA. World J. Gastroenterol. 10, 427-432 (2004).
Shannon, P. et al. Cytoscape: a software Environment for integrated models of biomolecular interaction networks. Genome Res. (2003). doi:10.1101/gr.1239303.
Sheridan, C. Exosome cancer diagnostic reaches market. Nat. Biotechnol. 34, 359-360 (2016).
Shimanovich, U. et al. Sequential Release of Proteins from Structured Multishell Microcapsules. Biomacromolecules 18, 3052-3059 (2017).
Sulatskaya, A. I., Lavysh, A. V., Maskevich, A. A., Kuznetsova, I. M. & Turoverov, K. K. Thioflavin T fluoresces as excimer in highly concentrated aqueous solutions and as monomer being incorporated in amyloid fibrils. Sci. Rep. 7, 1-11 (2017).

(56) References Cited

OTHER PUBLICATIONS

Sun, D. & Hu, T. Y. A low cost mobile phone dark-field microscope for nanoparticle-based quantitative studies. Biosens. Bioelectron. 99, 513-518 (2018).

Sun, D. et al. A Noise Reduction Method for Quantifying Nanoparticle Light Scattering in Low Magnification Dark-Field Microscope Far-Field Images. Anal. Chem. 88, 12001-12005 (2016).

Sun, D., Yang, L., Lyon, C. J. & Hu, T. Simulation-directed amplifiable nanoparticle enhanced quantitative scattering assay under low magnification dark field microscopy. J. Mater. Chem. B (2020). doi:10.1039/d0tb00350f.

Sung, B. H., Ketova, T., Hoshino, D., Zijlstra, A. & Weaver, A. M. Directional cell movement through tissues is controlled by exosome secretion. Nat. Commun. 6, 7164 (2015).

Szklarczyk, D. et al. STRING v11: Protein-protein association networks with increased coverage, supporting functional discovery in genome-wide experimental datasets. Nucleic Acids Res. 47, D607-D613 (2019).

Szklarczyk, D. et al. The STRING database in 2017: Quality-controlled protein-protein association networks, made broadly accessible. Nucleic Acids Res. 45, D362-D368 (2017).

Valadi, H. et al. Exosome-mediated transfer of mRNAs and microRNAs is a novel mechanism of genetic exchange between cells. Nat. Cell Biol. 9, 654-659 (2007).

Vyas, S., Zaganjor, E. & Haigis, M. C. Mitochondria and Cancer. Cell 166, 555-566 (2016).

Wang, X. et al. Exosomal protein CD82 as a diagnostic biomarker for precision medicine for breast cancer. Mol. Carcinog. 58, 674-685 (2019).

Went, P. T. et al. Frequent EpCam Protein Expression in Human Carcinomas. Hum. Pathol. (2004). doi:10.1016/j.humpath.2003.08.026.

Xu, H. X. et al. Postoperative serum CEA and CA125 levels are supplementary to perioperative CA19-9 levels in predicting operative outcomes of pancreatic ductal adenocarcinoma. Surg. (United States) 161, 373-384 (2017).

Xue, C. & Chang, D. Thioflavin T as an amyloid dye : fibril quantification, optimal concentration and effect on aggregation. (2017).

Yan, R., Xu, D., Yang, J., Walker, S. & Zhang, Y. A comparative assessment and analysis of 20 representative sequence alignment methods for protein structure prediction. Sci. Rep. 3, (2013).

Yang, H., Yang, S., Kong, J., Dong, A. & Yu, S. Obtaining Information about protein secondary structures in aqueous solution using Fourier transform IR spectroscopy. Nat. Protoc. 10, 382-396 (2015).

Yoshioka, Y. et al. Ultra-sensitive liquid biopsy of circulating extracellular vesicles using ExoScreen. Nat. Commun. 5, 3591 (2014).

Zhang, J. et al. Exosome and exosomal microRNA: Trafficking, sorting, and function. Genomics, Proteomics Bioinforma. 13, 17-24 (2015).

\* cited by examiner

FIG. 17

|  | Correlation |
|---|---|
| CA19-9 | 0.10345 (n=12) |
| CEA | 0.4285 (n=8) |
| Stage | 0.1987 (n=15) |
| Grade | 0.14064 (n=14) |

METHODS FOR IDENTIFYING CANCER

CROSS-REFERENCE TO RELATED APPLICATIONS

This application claims the benefit of U.S. Provisional Application Ser. No. 63/183,262, filed May 3, 2021, which is incorporated by reference herein in its entirety.

GOVERNMENT FUNDING

This invention was made with government support under R03CA252783 awarded by the National Institutes of Health. The government has certain rights in the invention.

SUMMARY OF THE APPLICATION

Tumor-derived extracellular vesicles (EVs) are under intensive study for their potential as noninvasive diagnosis biomarkers. Most EV-based cancer diagnostic assays trace supernumerary of a single cancer-associated marker or marker signatures. These types of biomarker assays are either subtype-specific or vulnerable to be masked by high background signals. As described herein, β-sheet richness (BR) of the tumor-derived EVs is used as an effective way to discriminate EVs originating from malignant and nonmalignant cells, where EV contents are evaluated as a collective attribute rather than single factors. Circular dichroism, Fourier transform infrared spectroscopy, fluorescence staining assays, and a de novo workflow combining proteomics, bioinformatics, and protein folding simulations were employed to validate the collective attribute at both cellular and EV levels. Based on the β-sheet richness of the tumorous EVs, we integrated immunoprecipitation and fluorescence labeling targeting the circulating tumor-derived EVs in serum and developed the process into a clinical assay, named EvIPThT. The assay can distinguish patients with and without malignant disease in a pilot cohort, with correlations to prognosis biomarkers, suggesting the utility for a cancer screening panel with existing prognostic biomarkers to improve overall performance.

Provided here are methods for identifying tumor-derived extracellular vesicles. The method can include combining an antibody and a sample under conditions suitable for formation of antigen-antibody complexes, where the antibody reacts with an extracellular vesicle tumor-specific surface antigen. The antibody can be, for instance, polyclonal or monoclonal. The antibody can be immobilized on a surface before the combining or after the combining. The extracellular vesicle tumor-specific surface antigen can include Epithelial cell adhesion molecule (EpCAM).

The sample can include a liquid biopsy. The sample can be from a human, and, the human can be suspected of having a tumor or known to have a tumor. The tumor can be a solid tumor associated with a malignant cancer chosen from pancreatic cancer, breast cancer, lung cancer, prostate cancer, and colon cancer.

The method can also include isolating the complexes, where the complexes can include enriched tumor-derived extracellular vesicles. The method can further include, after the isolating, removing the tumor-derived extracellular vesicles from the complexes to result in a mixture enriched for tumor-derived extracellular vesicles.

The method can also include exposing the tumor-derived extracellular vesicles to a compound that binds beta-sheet structures. The compound that binds beta-sheet structures can be Thioflavin T or Congo red.

The method can also include determining if there is an increase in binding of the compound to the extracellular vesicles compared to a negative control, or determining if binding of the compound to the extracellular vesicles is similar to a positive control, or the combination thereof. The increase in binding compared to the negative control can be statistically significant. The negative control can include extracellular vesicles produced by a cell line that is not cancerous, or extracellular vesicles from a subject that does not have a cancer. The positive control can include extracellular vesicles produced by a cell line obtained from a malignant tumor, including but not limited to PANC-1, or extracellular vesicles from a subject having a malignant tumor, or the combination thereof.

In one embodiment, the sample is from a subject, and the increase in binding of the compound to the extracellular vesicles compared to a negative control indicates the subject has a cancer, such as pancreatic cancer, breast cancer, lung cancer, prostate cancer, or colon cancer.

Terms used herein will be understood to take on their ordinary meaning in the relevant art unless specified otherwise. Several terms used herein and their meanings are set forth below.

The term "and/or" means one or all of the listed elements or a combination of any two or more of the listed elements.

The words "preferred" and "preferably" refer to embodiments of the invention that may afford certain benefits, under certain circumstances. However, other embodiments may also be preferred, under the same or other circumstances. Furthermore, the recitation of one or more preferred embodiments does not imply that other embodiments are not useful and is not intended to exclude other embodiments from the scope of the invention.

The terms "comprises" and variations thereof do not have a limiting meaning where these terms appear in the description and claims.

It is understood that wherever embodiments are described herein with the language "include," "includes," or "including," and the like, otherwise analogous embodiments described in terms of "consisting of" and/or "consisting essentially of" are also provided. The term "consisting of" means including, and limited to, whatever follows the phrase "consisting of." That is, "consisting of" indicates that the listed elements are required or mandatory, and that no other elements may be present. The term "consisting essentially of" indicates that any elements listed after the phrase are included, and that other elements than those listed may be included provided that those elements do not interfere with or contribute to the activity or action specified in the disclosure for the listed elements.

Unless otherwise specified, "a," "an," "the," and "at least one" are used interchangeably and mean one or more than one.

Conditions that are "suitable" for an event to occur, such as production of antigen-antibody complexes, or "suitable" conditions are conditions that do not prevent such events from occurring. Thus, these conditions permit, enhance, facilitate, and/or are conducive to the event.

As used herein, "substantially free of" a material refers to a composition having less than 10% of the material, less than 5% of the material, less than 4% of the material, less than 3% of the material, less than 2% of the material, or less than 1% of the material. In one embodiment, the presence of the material in a composition is undetectable.

Reference throughout this specification to "one embodiment," "an embodiment," "certain embodiments," or "some embodiments," etc., means that a particular feature, configuration, composition, or characteristic described in connection with the embodiment is included in at least one embodiment of the disclosure. Thus, the appearances of such phrases in various places throughout this specification are not necessarily referring to the same embodiment of the disclosure. Furthermore, the particular features, configurations, compositions, or characteristics may be combined in any suitable manner in one or more embodiments.

Throughout this disclosure, various aspects of the invention can be presented in a range format. It should be understood that the description in range format is merely for convenience and brevity and should not be construed as an inflexible limitation on the scope of the invention. Accordingly, the description of a range should be considered to have specifically disclosed all the possible Subranges as well as individual numerical values within that range. For example, description of a range such as from 1 to 6 should be considered to have specifically disclosed Subranges Such as from 1 to 3, from 1 to 4, from 1 to 5, from 2 to 4, from 2 to 6, from 3 to 6 etc., as well as individual numbers within that range, for example, 1, 2, 2.7.3, 4, 5, 5.3, and 6. This applies regardless of the breadth of the range.

For any method disclosed herein that includes discrete steps, the steps may be conducted in any feasible order. And, as appropriate, any combination of two or more steps may be conducted simultaneously.

BRIEF DESCRIPTION OF THE FIGURES

The following detailed description of illustrative embodiments of the present disclosure may be best understood when read in conjunction with the following drawings.

FIG. 17 shows Kendall correlation coefficients of EvIPThT to circulating CA19-9 and CEA, tumor stage and grade.

FIG. 22A and FIG. 22B. Fluorescence response to BSA concentrations with 50 μM and 20 μM, respectively. FIG. 22C Absorption at 412 nm response to ThT titration.

Figure 1:
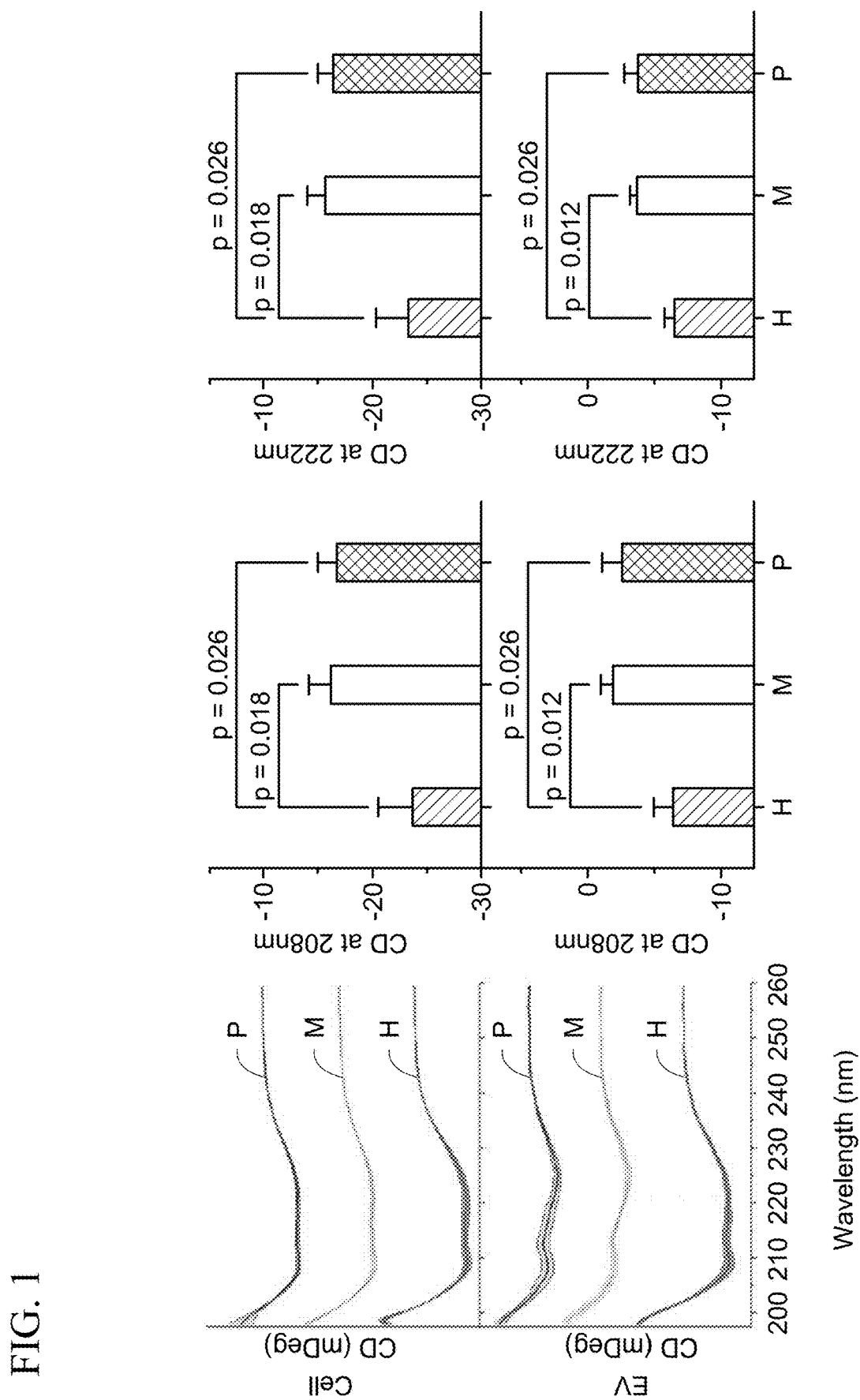
FIG. 1 shows β-sheet richness (BR) is a feature of pancreatic ductal adenocarcinoma (PDAC) cells and extracellular vesicles (EVs). CD spectra (stacked), peak value at 222 and 208 nm (due to $\pi \to \pi^*$ and $n \to \pi^*$ transition, respectively) of the cellular and EV proteins' CD spectra at a protein concentration of 0.5 and 0.2 mg/mL, respectively. H: hTERT-HPNE cells; M: MIA PaCa-2 cells; and P: PANC-1. Error bars, mean±s.e.m; n=3; n.s., not significant; and p values were determined by unpaired two-tailed t-tests.

The schematic drawings are not necessarily to scale. Like numbers used in the figures refer to like components, steps and the like. However, it will be understood that the use of a number to refer to a component in a given figure is not intended to limit the component in another figure labeled with the same number. In addition, the use of different numbers to refer to components is not intended to indicate that the different numbered components cannot be the same or similar to other numbered components.

DETAILED DESCRIPTION

The present disclosure provides methods for identifying tumor-derived EVs, identifying the presence and absence of extracellular vesicles (EVs) produced by tumors, and/or identifying the presence or absence of beta-sheet-rich proteins present in EVs obtained from a sample. Tumor-derived EVs are being evaluated for their potential role in noninvasive and minimally invasive diagnosis of cancer. Tumor-derived EVs, however, are only a small fraction of the EVs present in a subject, where the other EVs are not tumor-derived. As a result, identification of tumor-derived EVs is typically masked by high background signals leading to false positives.

As described herein, the inventor has, for the first time, validated the use of beta-sheet richness of EVs in discriminating EVs from malignant and nonmalignant origins as a biomarker for diagnosis.

The present disclosure provides methods that typically include enriching the tumor-derived EVs present in a sample and detecting beta-sheets of proteins in the mixture of enriched tumor-derived EVs. An increase in beta-sheets can be indicative of malignant cells, such as a malignant tumor. The detection can be, for instance, evaluating the presence or absence of beta-sheet-rich proteins or detecting an increase, a decrease, or no change of beta-sheet proteins compared to a control. The methods of the present disclosure can be used to identify the presence or absence of EVs produced by tumors, or to identify the presence or absence of beta-sheet-rich proteins present in EVs obtained from a sample.

The sample can be a fluid or tissue obtained from a subject, and includes but is not limited to, for example, a liquid biopsy such as saliva, urine, blood, including plasma and/or serum, or a tissue biopsy. A sample can be obtained from a subject known to have a cancer, or from a subject suspected of having a cancer. Examples of cancers include, but are not limited to, solid tumor cancers such as, but not limited to, pancreatic cancer, breast cancer, lung cancer, prostate cancer, and colon cancer. In one embodiment, the cancer is a malignant cancer. In one embodiment, a sample can be from a subject that is not suspected of having a cancer. The subject can be a human or animal, such as a mammal. Examples of non-human animals include murine animals (mouse and rat), and other animals used as model systems for the study of human cancers.

A sample can also be cell culture constituents including but not limited to conditioned media resulting from the growth of cells and/or tissues in culture medium, and cell components. Cells in a cell culture can be primary cells, e.g., cells that have recently been removed from a subject and are capable of limited growth in tissue culture medium, or cells of a cell line, e.g., cells that are capable of long-term culture in tissue culture medium. Examples of cell lines include, but are not limited to, the human pancreas/duct epithelioid carcinoma PANC-1 (ATCC® CRL-1469), the human pancreas epithelial cell carcinoma MIA PaCa-2 (ATCC® CRM-CRL-1420), and the human pancreas duct cells (non-malignant) hTERT-HPNE (ATCC® CRL-4023).

In some embodiments, the PANC-1 and MIA PaCa-2 cell lines can be used as positive controls and the hTERT-HPNE cell line can be used as a negative control in the methods of the present disclosure. In one embodiment, cell lines such as PANC-1, MIA PaCa-2, and hTERT-HPNE are useful as controls for in vitro experiments. In one embodiment, healthy donor samples are useful as negative controls for clinical evaluations.

Any method can be used to enrich a sample for tumor-derived EVs. As used herein, the term "enriched," means that the amount of tumor-derived EVs relative to the amount of non-tumor-derived EVs in a sample has been increased. In one embodiment, the amount of tumor-derived EVs are increased to a detectable amount. Enrichment does not imply that all non-tumor-derived EVs have been removed, or that all components that are not EVs have been removed.

In one embodiment, immunoprecipitation is used for enrichment. The method can include combining a sample and an antibody under conditions suitable for formation of antigen-antibody complexes. The antibody is typically one that can specifically bind with an EV tumor-specific surface antigen. As used herein, an antibody that can "specifically bind" an antigen is an antibody that interacts only with the epitope of the antigen that induced the synthesis of the antibody or interacts with a structurally related epitope. An antibody that "specifically binds" to an epitope will, under the appropriate conditions, interact with the epitope even in the presence of a diversity of potential binding targets. As used herein, the term "antigen-antibody complex" refers to the complex that results when an antibody specifically binds to an antigen. The antibody can be polyclonal or monoclonal.

An EV tumor-specific surface antigen is an antigen that can be used to distinguish tumor-derived EVs from non-tumor-derived EVs. In one embodiment, an EV tumor-specific surface antigen is present on a tumor-derived EV and is not present on non-tumor-derived EV. As example of an EV tumor-specific surface antigen is Epithelial cell adhesion molecule (EpCAM; Litvinov et al., 1994, J. Cell Biol., 125(2):437-446). Antibody to EpCAM is commercially available. Other examples of EV tumor-specific surface antigens are known (see, for instance, Boonstra et al., Biomarkers in Cancer 2016:8 119-133 doi:10.4137/BIC.S38542) and can be used in the methods disclosed herein.

Any format for immunoprecipitation can be used. In one embodiment a direct capture method is used and includes antibody to an EV tumor-specific surface antigen, such as anti-EpCAM antibody, immobilized on a substrate such as a bead. Various types of beads are known and available to the skilled person. In a direct capture method beads having the antibody are combined with a sample to form a mixture and, after a sufficient time for formation of antigen-antibody complexes, the beads with the bound antigen-antibody complexes are removed from the mixture. In one embodiment, beads are labeled to facilitate removal of the beads from a mixture. An example of a labeled bead is a magnetized bead. Another format for immunoprecipitation that can be used is an indirect capture method. In an indirect method antibody to an EV tumor-specific surface antigen, such as anti-EpCAM antibody, is added to a sample to form a mixture. After incubation for a sufficient period of time for formation of antigen-antibody complexes, a secondary antibody that reacts with the anti-EpCAM antibody is added to the mixture. The secondary antibody is typically immobilized on a substrate, and after a sufficient time the substrate is removed from the mixture. The result of both direct and indirect capture methods is isolated complexes that include tumor-derived EVs separated from other components present in the sample.

The method can optionally include removing the tumor-derived EVs from the complexes. Methods for disrupting the binding of antigen to antibody are routine and include, for instance, lowering the pH of the solution, ultrasonics, and/or use of a lysis buffer.

The method also includes detecting beta-sheet structures of proteins associated with the EVs present in the mixture of enriched tumor-derived EVs. Any method for detecting beta-sheep structures can be used. In one embodiment, the method includes exposing the mixture of enriched tumor-derived EVs to a compound that binds to beta-sheet structures. Examples of compounds that bind beta-sheet structures include, but are not limited to, Thioflavin T and Congo red. The amount of a compound that binds beta-sheet structures, such as Thioflavin T or Congo Red, that can be used depends upon the protein concentration of the sample and can be easily determined by the person skilled in the art. In one embodiment, the dynamic range and linearity of the compound can be used to determine an appropriate concentration to use. In one embodiment, the compound that binds beta-sheet structures is present at a final concentration of from 30 mircomolar to 40 micromolar.

Methods for evaluating whether a compound has bound to beta-sheet structures depends on the characteristics of the compound used. Thioflavin T is a fluorescent dye, and when bound to beta-sheet structures provides a strong fluorescence signal at approximately 482 nm when excited at 450 nm. In one embodiment, the degree of binding for each sample is normalized by the protein level. For instance, when using Thioflavin T the fluorescent intensity can be normalized by the amount of protein in each sample. In one embodiment, the change in binding of the compound to the extracellular vesicles compared to a negative control is statistically significant. In one embodiment, the method results in determining if there is an increase in binding of the compound to the extracellular vesicles present in the mixture.

Also provided herein are kits for identifying tumor-derived EVs, for identifying the presence or absence of EVs produced by tumors, or to identify the presence or absence of beta-sheet-rich proteins present in EVs obtained from a sample. A kit may include, in any combination, antibody to an EV tumor-specific surface antigen such as EpCAM, a surface such as a bead on which the antibody is immobilized or can be immobilized, and a compound such as Thioflavin T that binds to beta-sheet structures.

In certain embodiments, a kit may further include buffers and reagents useful for the procedure, and instructions for carrying out the assay. In certain embodiments, a kit may further include other useful agents, such as positive and/or negative control reagents, and the like.

Methods and kits disclosed herein may be carried out in numerous formats known in the art. In certain embodiments, the methods provided herein are carried out using solid-phase assay formats. In certain embodiments, the methods provided herein are carried out in a well of a plate with a plurality of wells, such as a multi-well plate. The use of multi-well assay plates allows for the parallel processing and analysis of multiple samples distributed in multiple wells of a plate. Multi-well assay plates (also known as microplates or microtiter plates) can take a variety of forms, sizes and shapes (for instance, round- or flat-bottom multi-well plates). Examples of multi-well plate formats that can be used in the methods provided herein include those found on 96-well plates (12×8 array of wells), 384-well plates (24×16 array of wells), 1536-well plate (48×3 2 array of well), 3456-well plates and 9600-well plates. In certain embodiments, the plates are opaque-wall, opaque-bottom plates. In certain embodiments, the plates are black-wall, black-bottom plates. In certain embodiments, the plates have black walls and clear bottoms in order to allow bottom excitation and reading of the fluorescence signals.

EXAMPLES

The present disclosure is illustrated by the following examples. It is to be understood that the particular examples, materials, amounts, and procedures are to be interpreted broadly in accordance with the scope and spirit of the disclosure as set forth herein.

Example 1

Beta-Sheet Richness of Circulating Tumor-Derived Extracellular Vesicles for Noninvasive Pancreatic Cancer Screening Extracellular vesicles (EVs), which contain biomolecules from parental cells, play important roles in cell-cell signaling,(1-4) immune response,(5) and metastasis. (6,7) EVs have been recognized as an excellent biomarker reservoir for the detection of many types of cancers, including colorectal, breast, and pancreatic cancer.(8-14) EVs released into circulation are under intensive investigation to tap the theoretical potential as noninvasive detection biomarkers for their preponderance compared with other candidates such as circulating tumor cells.(15-17) Most of these studies focus on EV single protein/RNA/mutant DNA allele or molecular signatures based on multiplex assays, but such markers are problematic since they are either subtype-specific leading to false-negative or easily masked by high background signals in the liquid biopsy, leading to false positives.(18,19) To date, none of the candidate markers have been approved for cancer screening in clinical practice, which underlies the problem in many liquid biopsy studies including the current EV marker discovery approaches. Translating disease-derived EVs into biomarkers has also been challenging due to the lack of simple methods for EV analysis. Conventional detection technologies require time-consuming and labor-intensive isolation and purification procedures (e.g., ultra-centrifugation or multistep filtration), followed by EV quantification and/or analyses of EV molecular contents. (4,20-22) The common practice of EV quantitation is through scattering based nanoparticle tracking analysis (Nanosight Ltd.) or tunable resistive pulse sensing (qNano, IZON Science Ltd.), which are counting-based quantification bearing considerable variations. (23-28) Most of these techniques would be impractical for clinical use since they require relatively large sample volumes, are complex, low throughput, and expensive, and have long turnaround times.

Protein quantification and analysis are well-accepted approaches for EV-based biomarker discovery but limited to the identification without structural information. We studied the collective attribute of EV by analyzing the secondary structure of the EV proteins using circular dichroism (CD), Fourier transform infrared (FT-IR), and fluorescent staining rather than single biomarkers. We found malignant cell secretes more β-sheet-rich proteins into EVs than their nonmalignant counterparts. Theoretical rationale integrating proteomics, bioinformatics, and protein folding simulation also concluded the β-sheet richness (BR) of the malignant cells and EVs considering the individual proteins' contributions. Furthermore, the theoretical validation workflow highlighted an extended analysis combining protein-protein interaction and enrichment analysis, providing unprecedented opportunities to interrogate the stereochemical features associated with malignancy. Krafft et al. introduced the secondary structural signature of EV as a cancer screening marker.(29) However, intricated equipment (FT-IR and Raman spectrometry) and EV purification requirements hinder further translational development. To develop a cancer screening assay targeting BR of circulating tumor-derived EVs, we designed a protocol integrating immunoprecipitation (IP) and fluorescence detection, named EvIPThT. The assay readout of a retrospective pilot cohort showed sufficient discriminatory power comparing samples from cancer cases, disease controls and healthy donors, and a weak correlation to the concurrent prognosis biomarkers. Since no BR change was observed in the chemo-treated malignant cells compared with nontreated ones, the simple, inexpensive, low sample (100 µL) and time consumption (1 h), high-throughput, and automatable EvIPThT assay shows promise as a cancer screening assay, filling the translational gaps left by current EV detection applications.

Results

Tumorous EV Proteins are β-Sheet-Rich.

Figure 2:
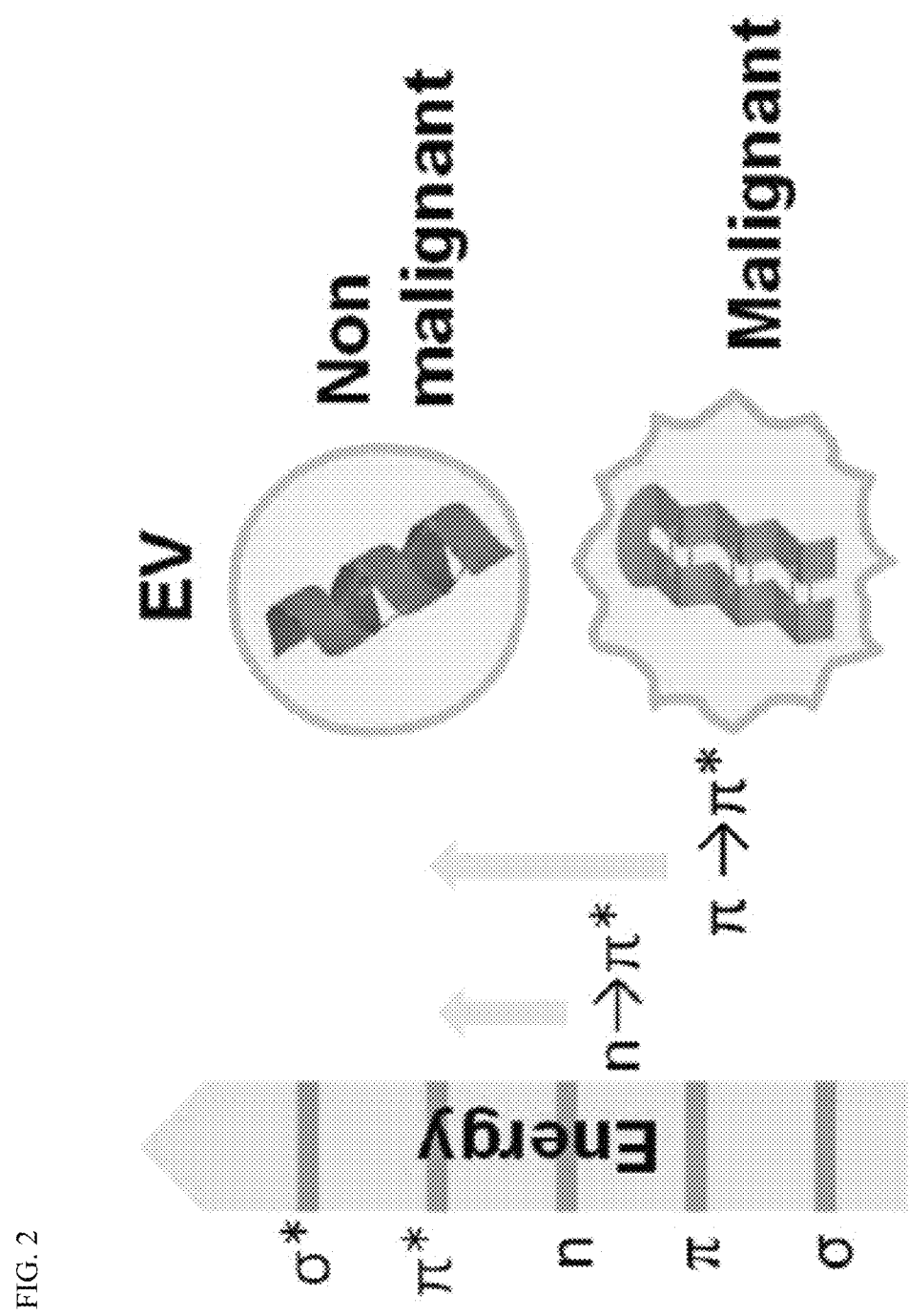
FIG. 2 shows absorption involves the promotion of an electron to a higher state (Left), and a schematic cartoon of the α-helix-rich normal EVs and β-sheet-rich tumorous EVs (Right).

CD spectroscopy, defined as the unequal absorption of left-handed and righthanded circularly polarized light, is a sophisticated and excellent indicator for rapidly evaluating the secondary structure and folding and binding properties of proteins.(30) Secondary structural elements of protein (α-helix and β-sheet and random coil) have their CD spectra features. However, CD analysis targets mostly purified single proteins and peptides.(31) Using CD for characterizing EV proteins is underexplored. We designed and optimized an experimental protocol for characterizing EV using CD measurement. We analyzed EVs isolated from three pancreas cell lines: a cell line derived by immortalization of primary ductal pancreas cells [HPNE (H), nonmalignant] and two representative primary pancreatic ductal adenocarcinoma (PDAC) cell lines (malignant) with different genotypes [PANC-1 (P) and MIA PaCa-2 (M)]. We observed significant differences in the CD spectrum between malignant and non-malignant at both cellular and EV levels (FIG. 1). By scrutinizing the far-UV spectra, non-malignant cells and EVs presented profiles similar to a typical α-helix abundant protein, while malignant counterparts presented a classic β-sheet abundant protein profile.(32) Therefore, we hypothesized that α-helix is richer in non-malignant EVs, whereas β-sheets are richer in tumorous EVs (schemed in FIG. 2). It is comparatively easy to validate the α-helix richness in non-malignant EVs because α-helix is featured by negative bands at 222 and 208 nm and due to it π→π* and n→π* transition, respectively (FIG. 2).(33) The corresponding negative level of these two peaks (FIG. 1) verified the first hypothesis that nonmalignant compared to malignant cells are richer in α-helix at both the cellular and EV levels. Such an n→π* transition, involving protein carbonyl and amide groups, has been estimated to require 5 to 25% of the energy compared with a standard hydrogen bond.(34) This is consistent with the Warburg effect which proposes that nonmalignant cells consume less energy than malignant cells.(35)

Figure 3:
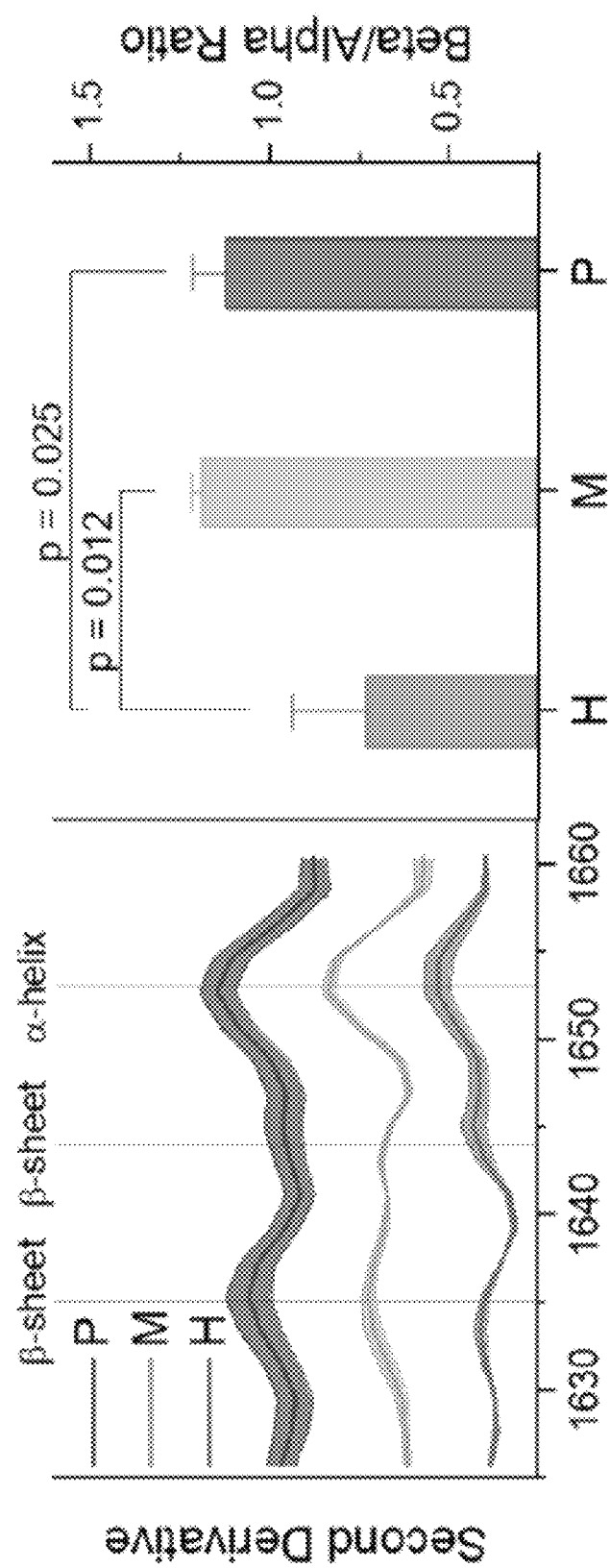
FIG. 3 shows second derivative infrared (IR) spectra (left) of amide I region for protein secondary structure accessing, and relative intensities of amide I bands providing the spectroscopic β-sheet-to-α-helix ratio (right).

The other hypothesis that tumorous EVs are richer in β-sheets than EVs from nonmalignant origins, however, is not practical to prove by CD peaks because the spectra of predominant β-sheets have π→π* transitions with magnitudes that are typically three to five times smaller than those generated by α-helix and thus are easily masked.(33) FT-IR spectroscopy measuring the wavelength and intensity of the absorption of IR radiation is another useful tool for determining the secondary structure of proteins.(36) The broad envelope of the amide I region (1700-1600 cm-1) can be resolved to individual band components, which characterize the α-helical, β-sheet, and random content of the given proteins.(29,37) We thus investigated the protein secondary structure of the EVs through the second derivative IR spectra of the amide I band (FIG. 3 left). EV changes in the protein secondary structure were witnessed by favoring α-helix (band component at 1653 cm-1) or β-sheet conformations (1635 and 1644 cm-1). The integrated intensity of the α-helix band with a peak at 1653 cm-1 as Aα and β-sheet with a peak at 1633 and 1644 as Aβ were used to calculate the spectroscopic β-to-α ratio: Aα/Aβ. Quantitative analysis by integrating each band elucidated that the β-sheet-to-α-helix ratio was significantly higher in tumorous EVs than normal ones (FIG. 3 right). This is evidence to support the second hypothesis that the β-sheet is richer in the tumorous EV proteins.

Figure 4:
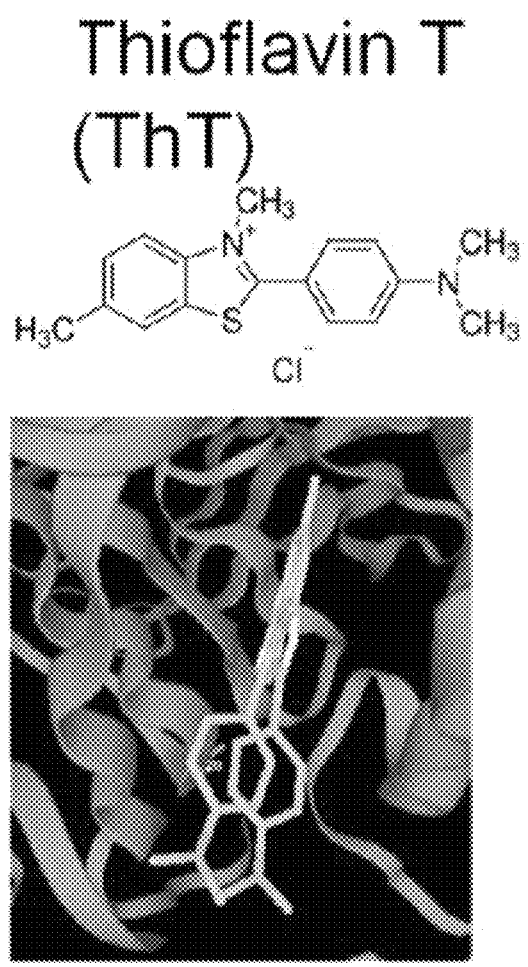
FIG. 4 shows chemical structure of thioflavin T (ThT) and its binding example to β-sheets (adapted from 3decision-.discngine.com). Confocal micrographs of cells stained with 50 nM ThT. Scale bars represent 10 μm.
Figure 4:
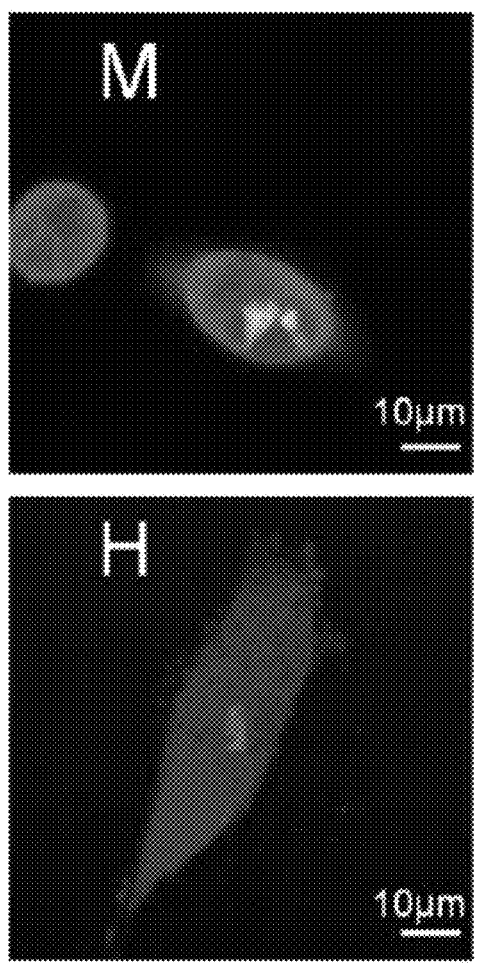
Figure 5:
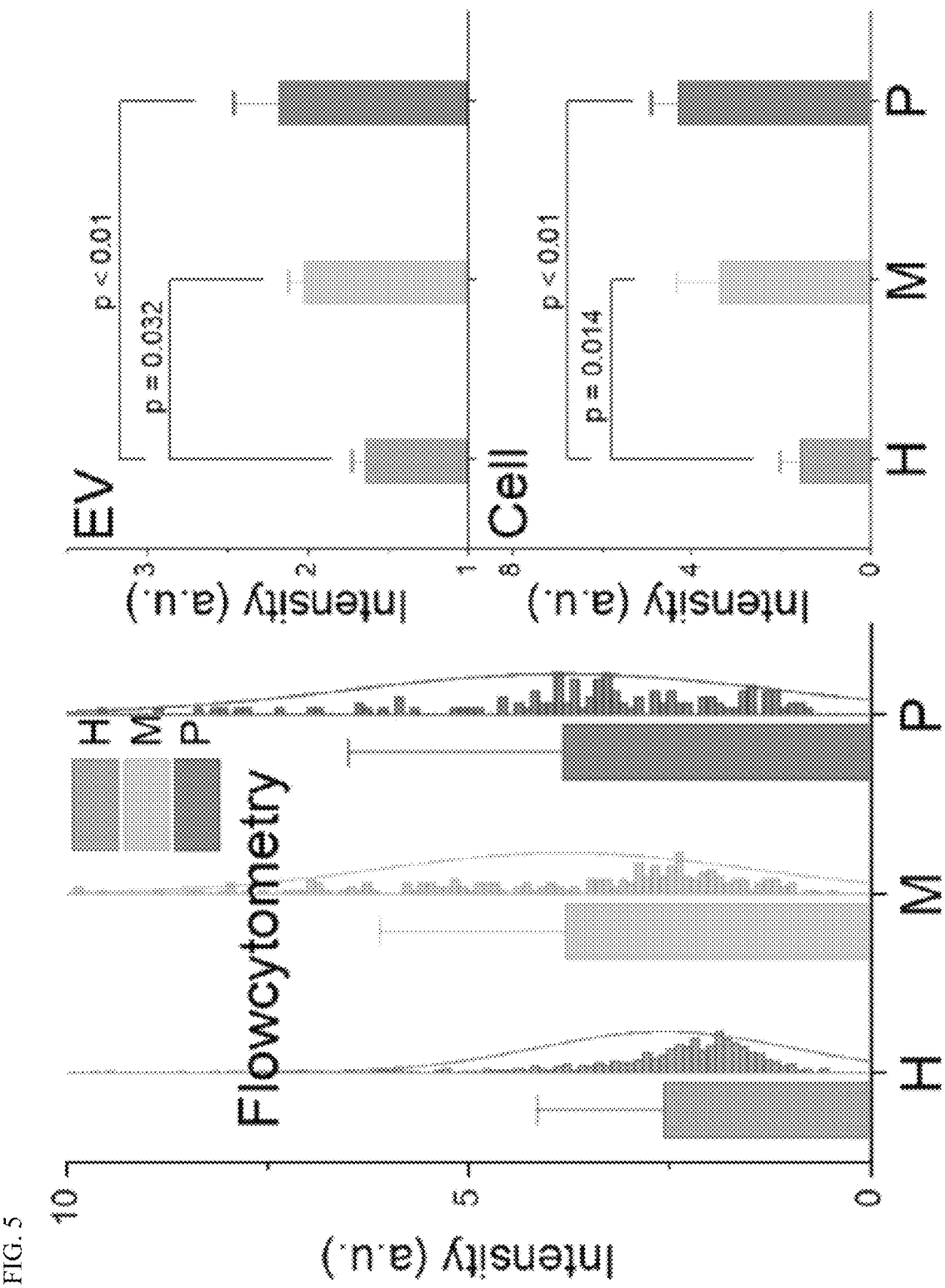
FIG. 5 shows flow cytometry measurement of ThT-stained cells (left). Fluorescence intensity of the ThT-stained proteins from cellular and EV lysates (right).

To provide further evidence for the second hypothesis, we conducted thioflavin T (ThT) staining (FIG. 4 right). ThT is a proven tool to bind with β-sheets (FIG. 4 left), giving a strong fluorescence signal at approximately 482 nm when excited at 450 nm upon binding.(38-40) Fluorescence microscopy and flow cytometry results (FIG. 4 right, FIG. 5 left) confirmed the BR of the tumorous cells. EV level and cell lysate staining were detected under a fluorescence plate reader (FIG. 5), confirming the BR in tumorous EVs. These experimental observations (CD, FT-IR, and ThT staining), together, suggested that proteins in PDAC tumor cells and EVs are richer in β-sheets than their nonmalignant counterparts.

β-Sheet Richness in Tumorous Cells and EVs by Counting Individual Proteins.

Figure 6:
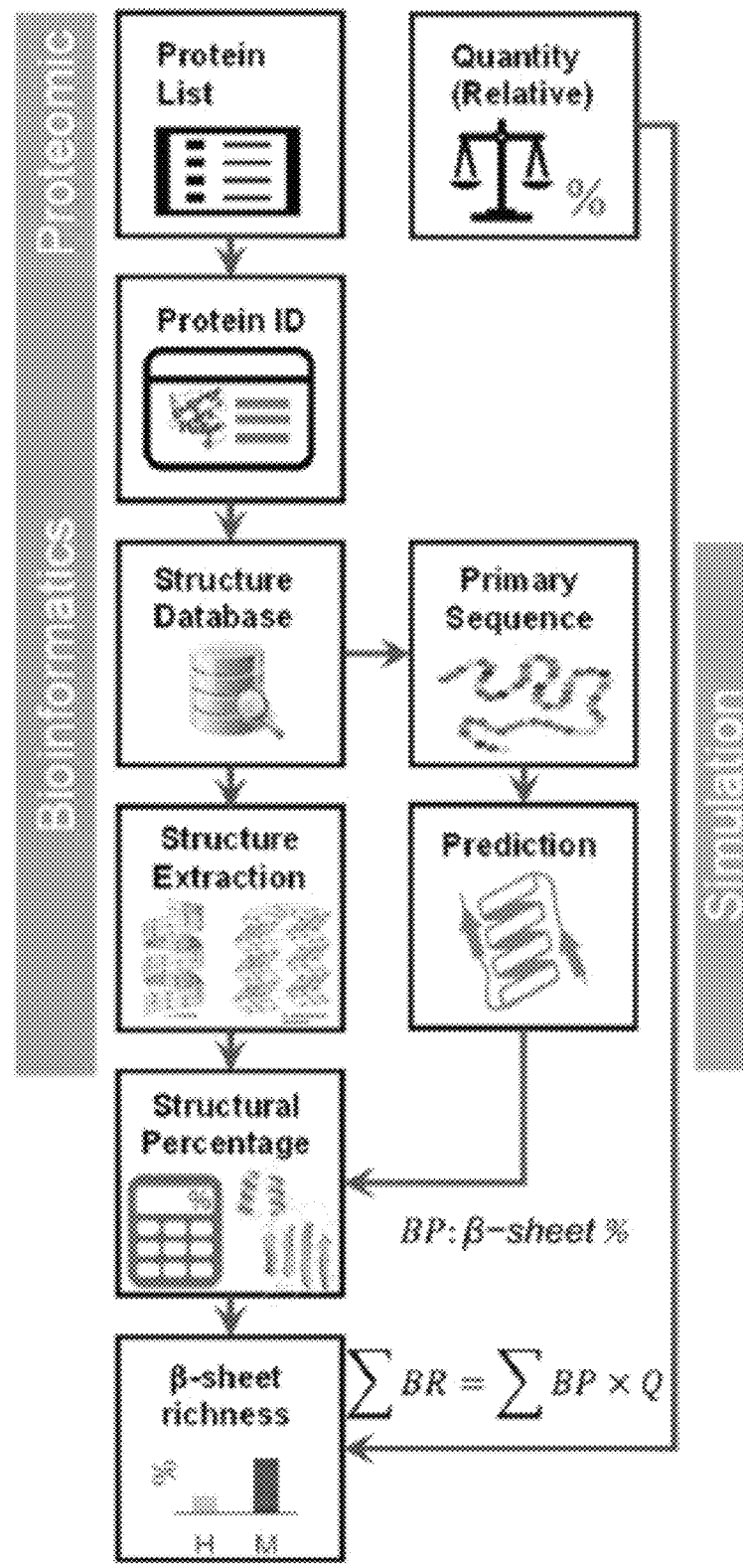
FIG. 6 shows BR analysis workflow.

CD, FT-IR spectrometry, and ThT staining assay reveal the aggregate attributes of protein in the EV and cell compartments without identifying individual proteins' contributions. We next investigated the secondary structure contribution of individual proteins. Modern mass spectrometry-based protein profiling introduces not only individual identification but also the quantitative information of individual protein contained in the sample, thus helping in comparative proteomics to enumerate the proteins in malignant and nonmalignant tissue at both cellular and EV levels. We designed a workflow to process proteomics result for the structural richness of the samples combining bioinformatics and simulation (FIG. 6). Briefly, each protein identified in the proteomics study was searched for in the protein databank (UniProt). The secondary structure information was used to calculate typical secondary structural configuration percentages for the protein. The primary sequence from the database was used in secondary structure prediction software to estimate the structural percentage. Since most of the proteins in the protein bank do not have completed secondary structure information, the final structural percentage of each protein was estimated using the following equation, $BP=pBP_{db}+(1-p)BP_{sim}$, where p is the percentage of the sequence length with a known structure in the protein bank and $BP_{db}$ and $BP_{sim}$ are the β-sheet percentages (BPs) calculated from the protein database and simulation, respectively. The BR of a protein in the sample was defined as $BR=BP \cdot Q$, counting the relative quantity (Q) and BP of the protein. The BR of a sample was thus the sum of BR, denoted as ΣBR. Following the workflow, we reanalyzed our comparative proteomics result attained for one PDAC cell line [MIA PaCa-2 (M), malignant] and one immortalized normal human ductal epithelial cell line [HPNE (H), nonmalignant] at both EV and cellular levels.(41)

Figure 7:
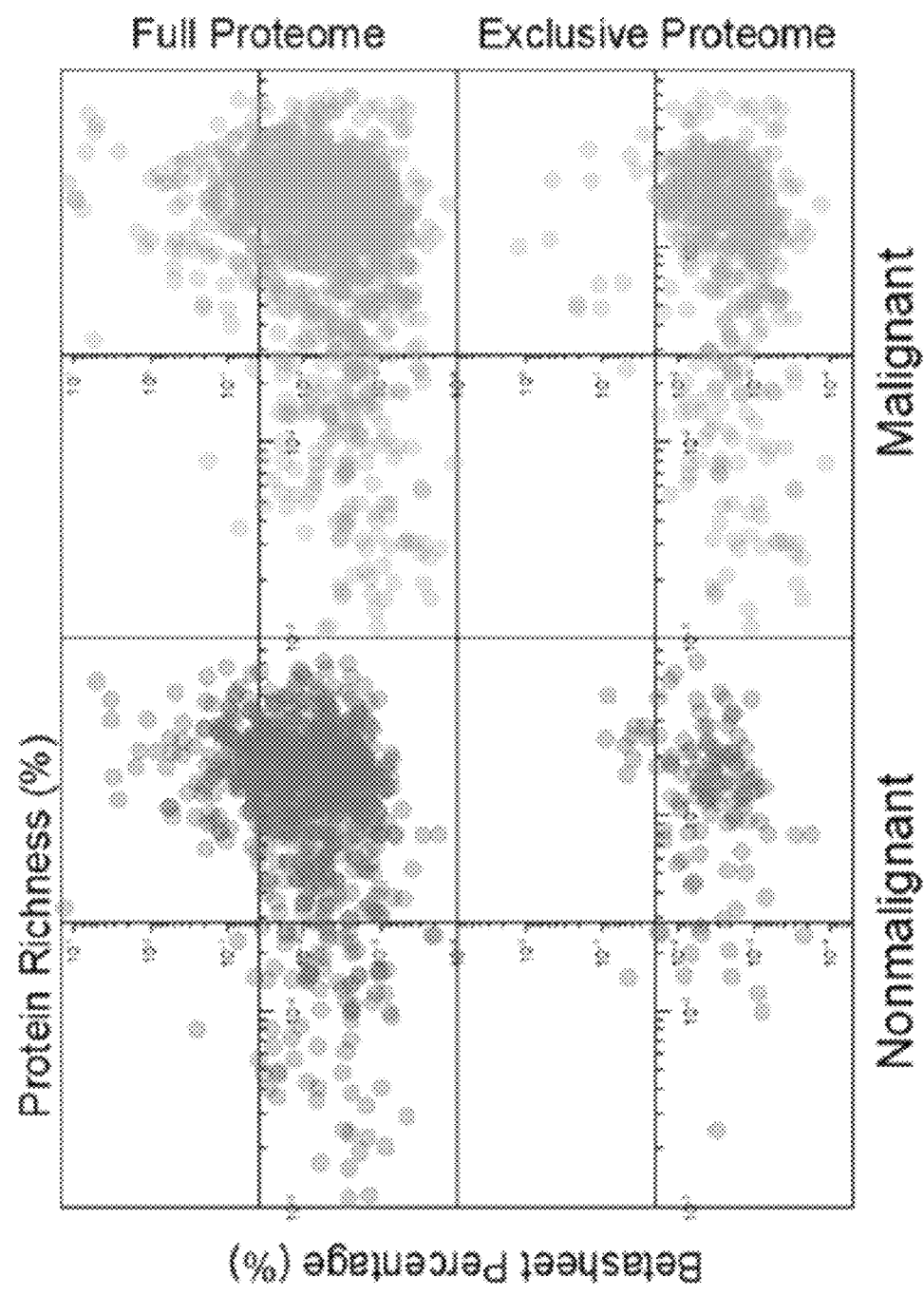
FIG. 7 shows scatter plot paring β-sheet percentage (BP) and protein richness (Q). Nonmalignant: HPNE; Malignant: MIA PaCa-2.
Figure 8:
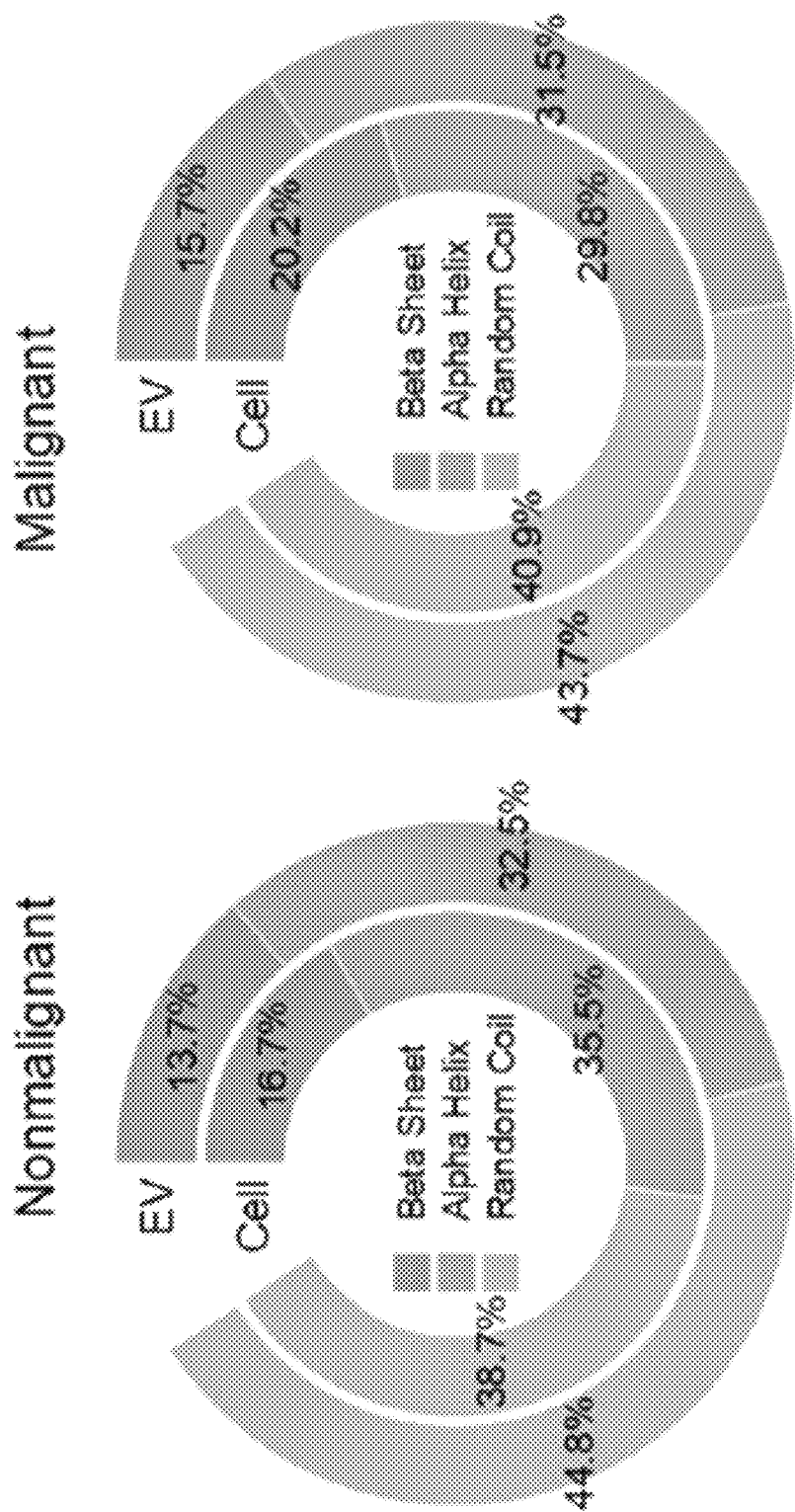
FIG. 8 shows protein structural constitute of cells at cellular and EV levels.

Pairing protein richness (defined as the percentage of individual proteins in the sample, Q) with the BP of the protein, the scatter plot (FIG. 7) demonstrates more β-sheet-rich proteins fell into the high richness quadrant (top-left) for malignant cells than nonmalignant counterparts. After removing all the overlapped proteins between nonmalignant and malignant cells, the same trend is observed. To obtain the collective structural richness counting individual protein's contribution, we investigated all secondary structures (α-helix, β-sheet, and random coil) at both cellular and EV levels following the workflow and similar calculation. Malignant cells and EVs contain higher BR (ΣBR) than nonmalignant counterparts (FIG. 8). This result confirms the higher BR of the malignant cells and EVs by investigating individual protein's structural contribution. Notably, both nonmalignant and malignant cells exhibited higher BR at the cellular level than EVs, but the ratio differences between EV and cellular BR were similar (~82%). This observation suggests that passive exocytosis occurs from the cell into the EV with no sorting preference for (3-sheet-rich proteins.

Figure 9:
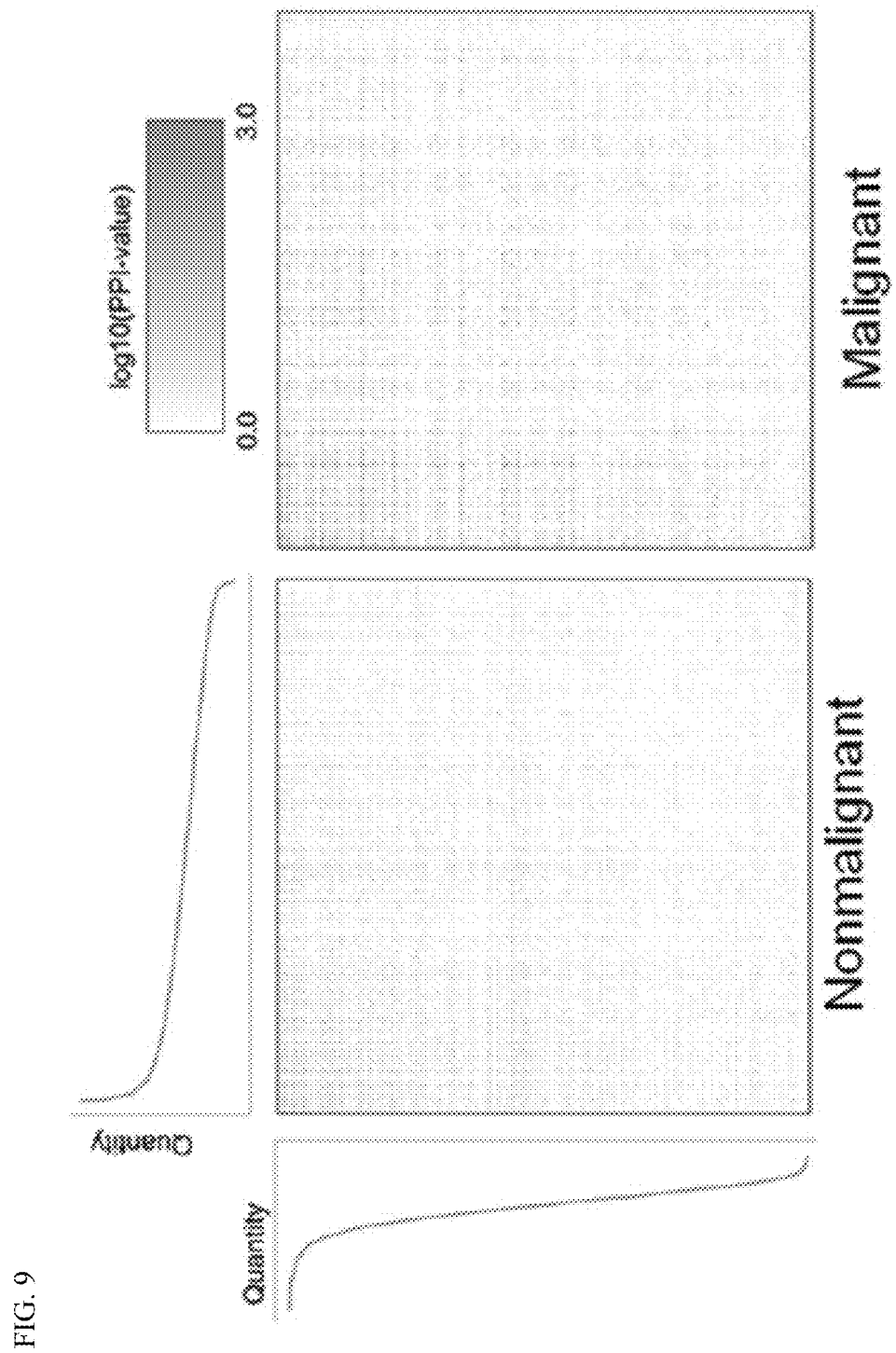
FIG. 9 shows protein-protein interaction (PPI) heat map sorted by the relative quantity of the proteins (Q). Each node (x and y axes) represents a protein ranked by relative protein quantity (Q)·n=1,103,777 for malignant and nonmalignant cells, respectively.
Figure 10:
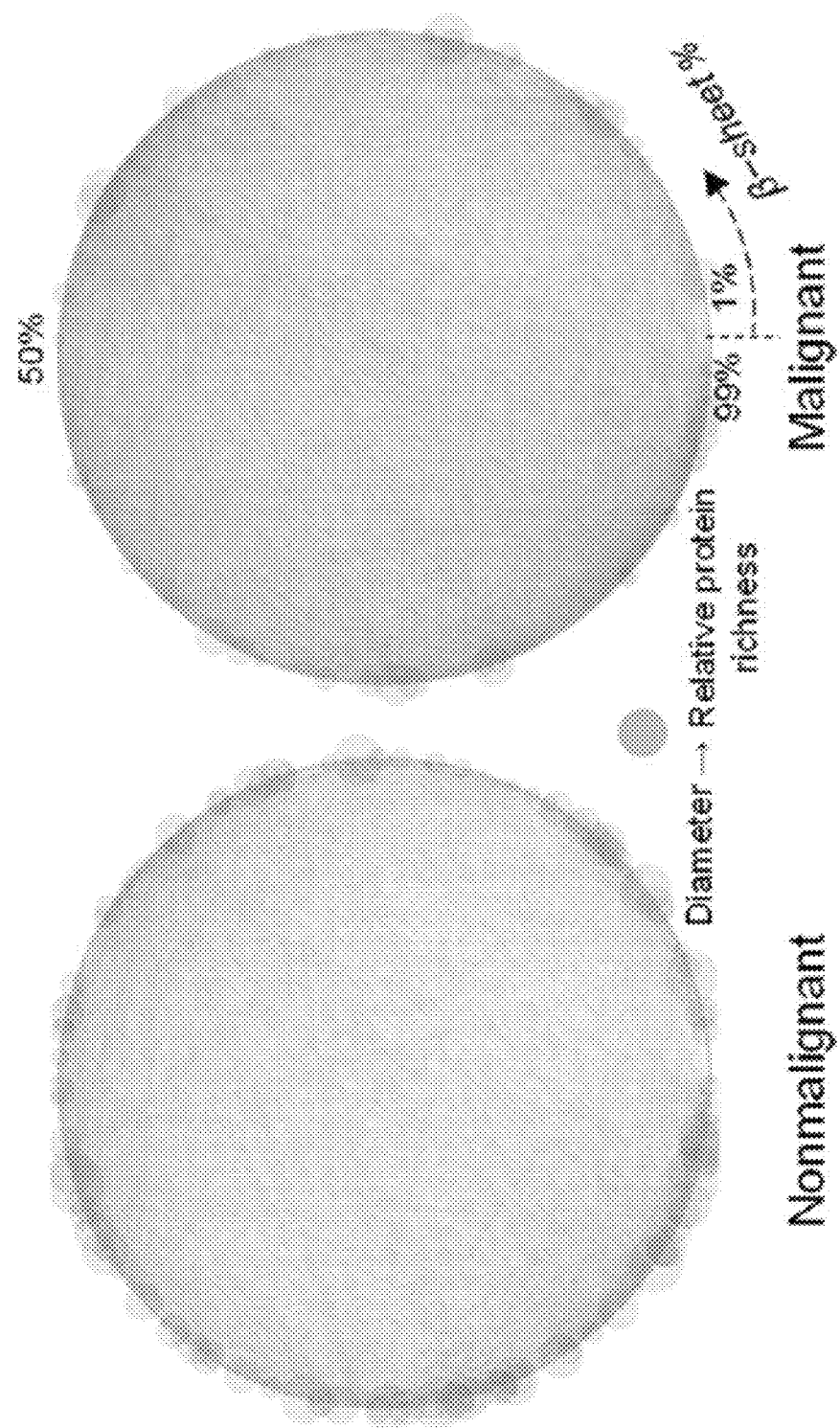
FIG. 10 shows circular PPI network graphs sorted by BP. Node size represents Q.

The abovementioned workflow potentiates a new analysis combining protein-protein interaction (PPI) information. We integrated the PPI result retrieved from the STRING42 database to the proteomics result at the cellular level. It is noteworthy that the interactions are denser for proteins with high quantity within both nonmalignant and malignant cells (FIG. 9). The unbalanced interaction distribution of the malignant cells highlights the impact of the high abundance proteins to biological functions. We further combined PPI, BR, and relative quantity (Q) into circular network graphs (FIG. 10). Malignant cells presented a more complicated interaction network than nonmalignant. It advocates using collective attributes for cancer detection rather than a single protein hallmark, considering the complex protein-protein interaction context in tumor cells, making it difficult to attribute cancer development and progression to any one specific protein. This also explained why previous single markers have failed in various clinical situations to represent the complicated tumor cells, such as reporting false-positive.(43) Of note, the relative quantity (Q) of the protein dispersed over BP in nonmalignant cells but not in the malignant cells. Moreover, the denser interactions at a high BP (bottom-left corner) in malignant cells reveal the crucial effects of β-sheets on the biological functions of the tumor cell. These results suggest that β-sheet-rich proteins may play important roles in malignant cells, which endorse the secondary structure as a collective attribute to indicate the tumor cells' intricate homeostasis.

Figure 20:
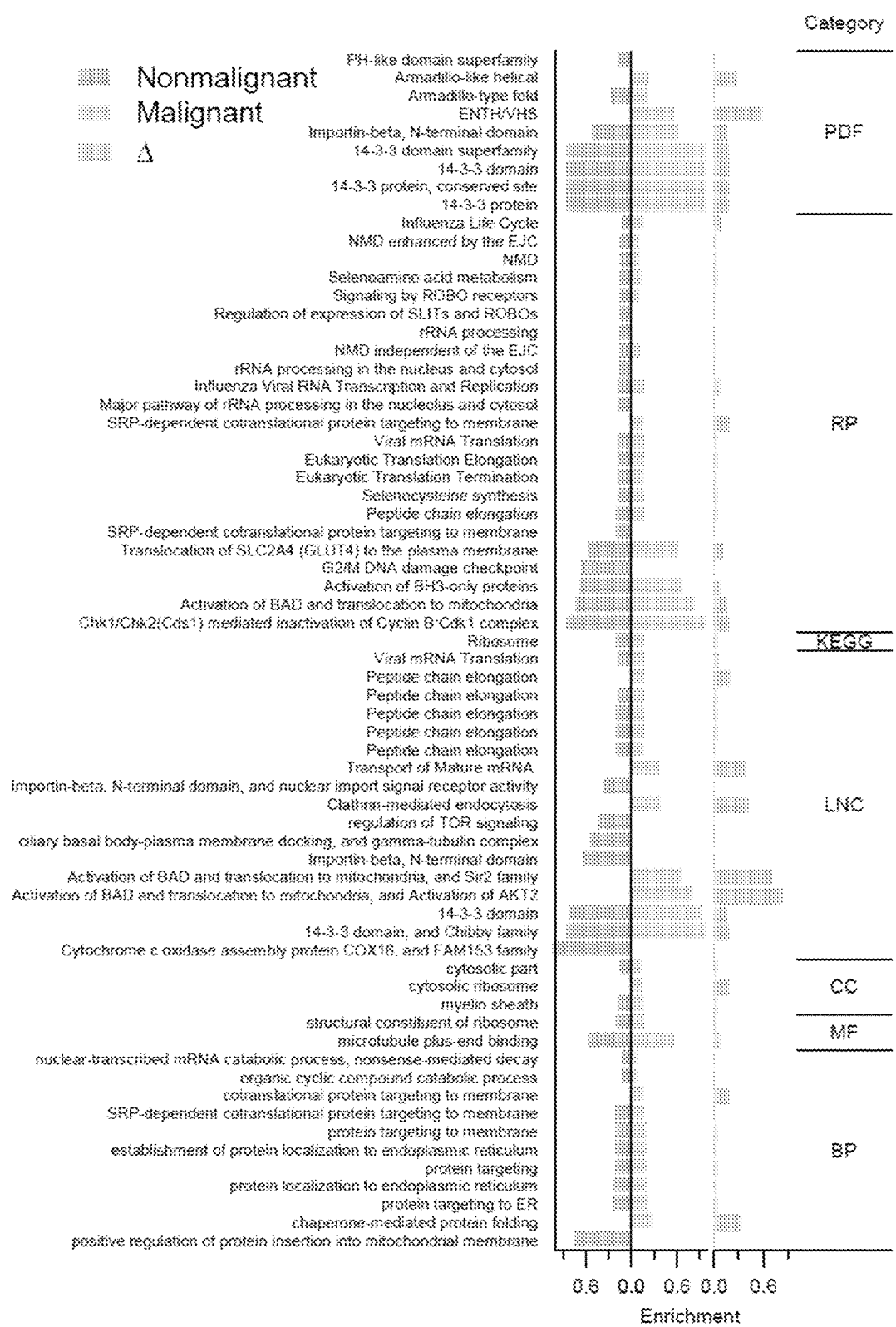
FIG. 20 shows functional enrichment analysis result. ΔE denotes the enrichment score difference between nonmalignant and malignant cells. BP, Biological Process; MF, Molecular Function; CC, Cellular Component; LNC, Local Network Cluster; KEGG, KEGG Pathways; RP, Reactome Pathways; PDF, Protein Domains and Features. First column, nonmalignant; second column, malignant; third column, ΔE; fourth column, category.

To gain functional insights into the β-sheet-rich proteins of tumor cells, gene ontology (GO) term enrichment analysis was conducted comparatively using the BRs of the proteome (FIG. 20). With ΔE denoting the enrichment score difference between malignant and nonmalignant cells, GO enrichment analysis within local network cluster (LNC) (FIG. 11) showed the β-sheet preference in malignant cells. Specifically, proteins related to BCL2 associated agonist of cell death (BAD) activation anchored on the mitochondrion membrane (44) were β-sheet enriched. Altered energy metabolism plays a central role in cancer development and progression, and increased mitochondrial abundance is a common characteristic of tumors that exhibit worse clinical outcomes.(45,46) Inspired by the enrichment analysis result, we next examined the BR over mitochondrial proteome (FIG. 12). Interestingly, both nonmalignant and malignant mitochondrial proteome showed higher BR than the cellular proteome (compared with FIG. 8). Since β-sheets consume more energy to fold, BR of the mitochondrion is consistent with its powerhouse organelle attribute. However, the richness difference between mitochondrial and cellular proteins (23.2 vs 20.2%) is higher in malignant cells. This result may explain the inefficiency of the aerobic glycolysis in tumor cells since more energy disperses in β-sheet-rich proteins of the mitochondrion Altogether, the workflow combining bioinformatics and simulation to analyze the proteomics result can serve as a de novo methodology. It validated the BR of the tumor cells at both cellular and EV levels by counting individual protein's contribution and enabled two further analyses PPI and enrichment analysis that links stereochemistry and biological function of the proteins, providing deeper insights into the tumor biology by means of energy distribution.

EvIPThT, Development of Clinical Method Using the Secondary Structure of Circulating EV Proteins.

Although a significant secondary structure difference was observed between EV from nonmalignant and malignant origins, PDAC-derived EVs are expected to constitute a small fraction of the total serum EV population. Even for the malignant patients at the latest stage, tumorous EVs in the circulation system are comparatively minor. The signal from (3-sheets contributed by these EVs could be masked by heterogeneous signals arising from the bulk of circulating EVs derived from nonmalignant cells.

Figure 13:
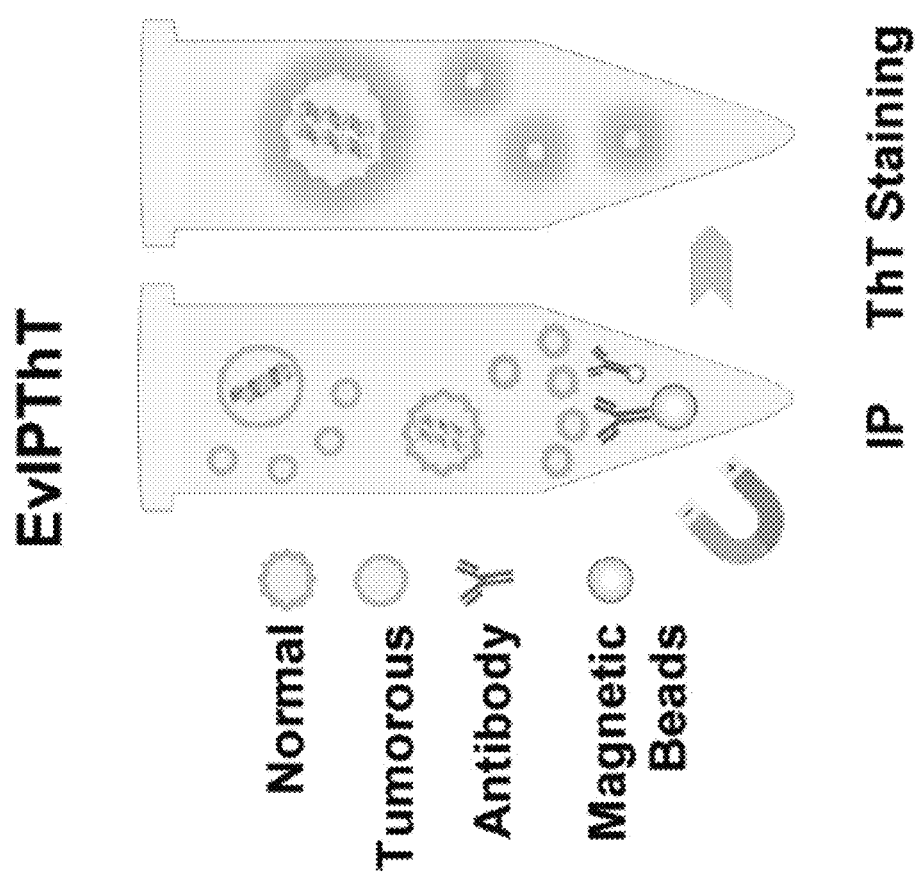
FIG. 13 shows diagram of EvIPThT protocol combining IP and ThT staining.
Figure 14:
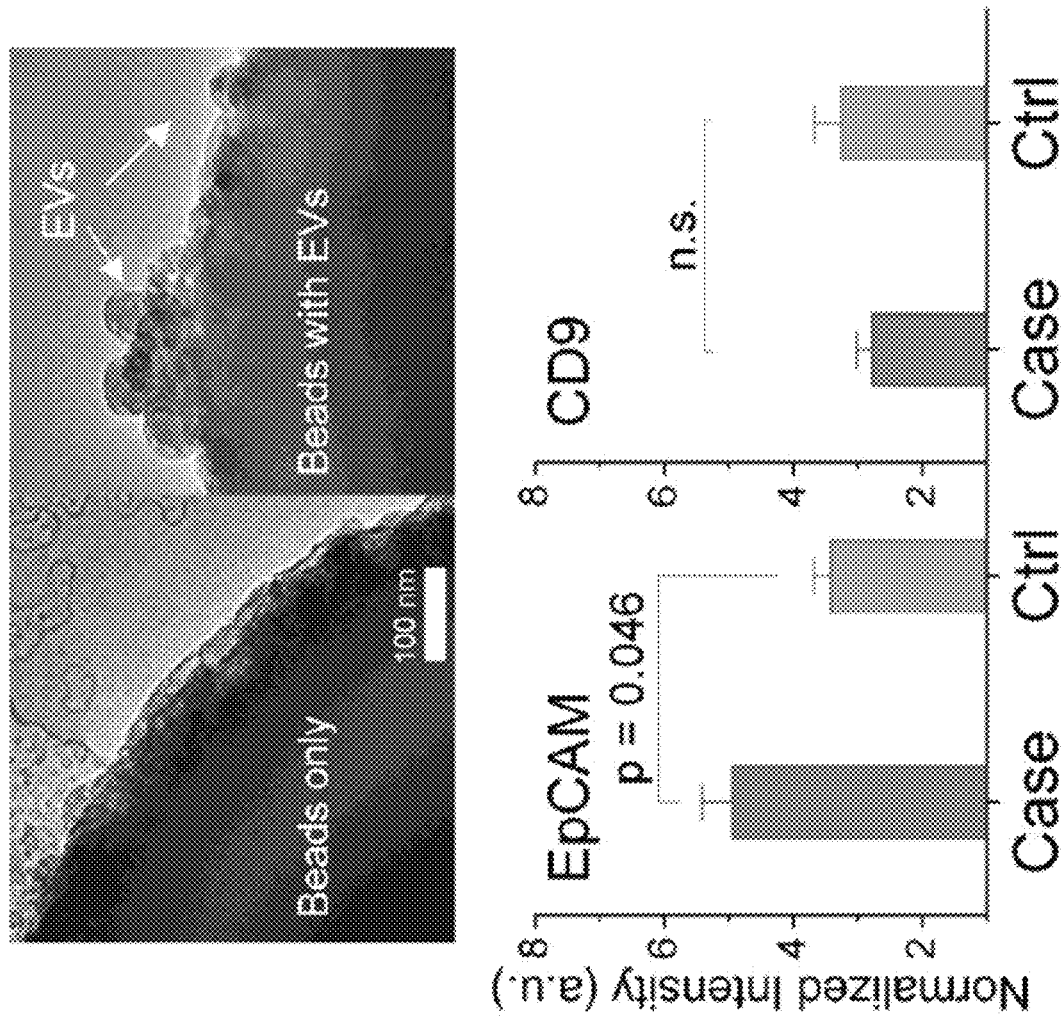
FIG. 14 shows transmission electron microscopy (TEM) images showing IP enrichment of EpCAM+EVs (Top), and assay validation with anti-EpCAM and CD9 for IP (Bottom). The case sample was constructed by spiking 5% EVs from PANC-1 cells into serum from a healthy donor. Control (ctrl): serum from the healthy donor (n=4).
Figure 15:
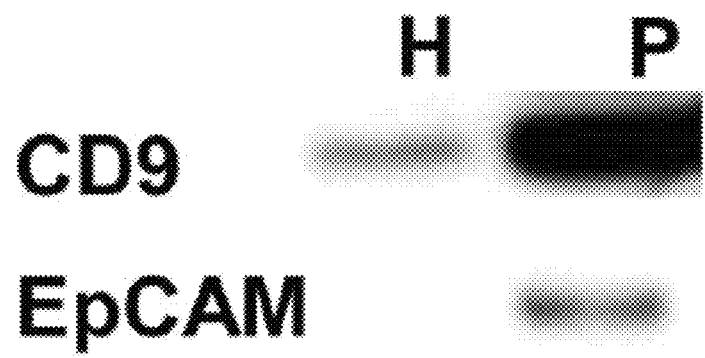
FIG. 15 shows Western blotting analysis of EpCAM and CD9 in H and P cells (Top), and ThT staining only without IP for the case and ctrl sample (Bottom) (n=4).
Figure 15:
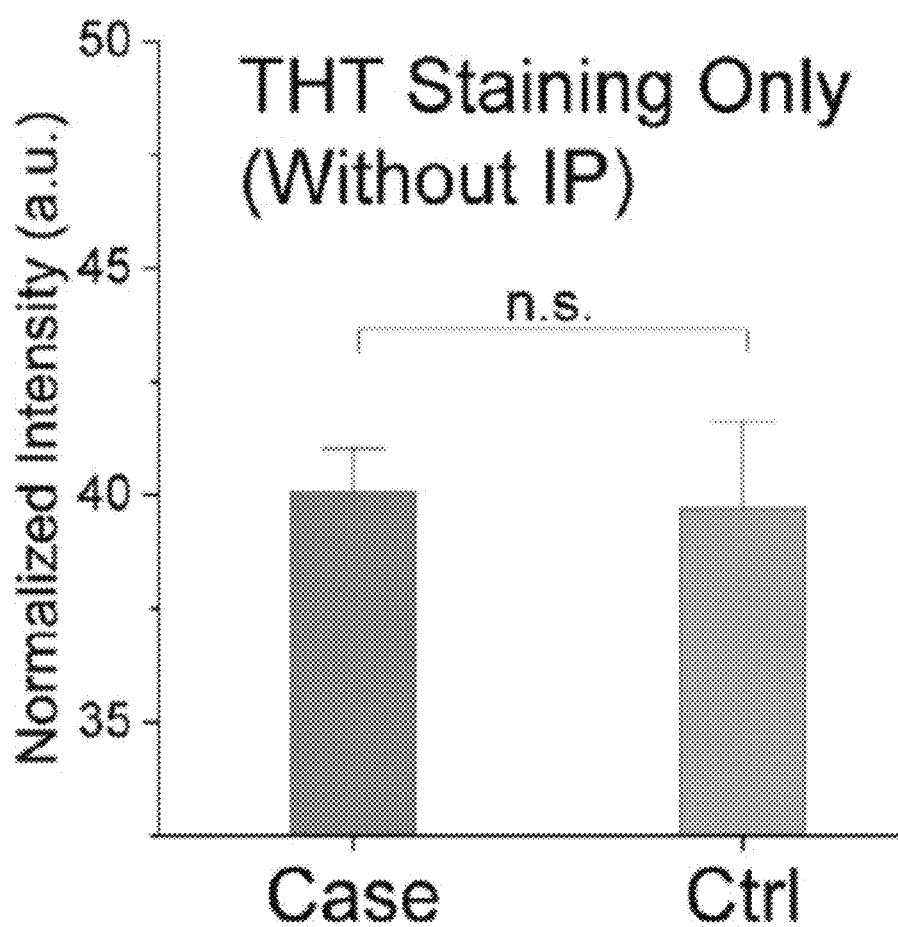

To promote the secondary structure of the EV proteins for noninvasive clinical diagnostics and avoid the delicate instrumentation requirement for detection (e.g., CD or FITR), we developed a fluorescent assay with a combination of IP and ThT staining. In order to enrich tumor-derived EV for detection in serum samples, the IP method targeting tumor derived EV's surface antigen was conducted before indicating BR of EV cargo proteins (including intravesicle and surface proteins) by ThT staining (schemed in FIG. 13), termed EvIPThT. IP is the canonical step that substantially saved time for EV isolation. A relevant factor of successful IP is the selection of membrane antigen. An epithelial cell adhesion molecule (EpCAM), an epithelial cell marker that is found overexpressed in PDAC tumors,(47-50) has been used to enrich tumor-derived EVs.(51,52) TEM images were used to validate the IP procedure for capturing tumorous EVs (FIG. 14 top). Western blotting (FIG. 15 top) was conducted to confirm the EpCAM expression on EVs from malignant cells (P), while common EV markers (CD9), a well-known pan EV surface marker used to isolate EVs,53-55 expressed on EVs from both malignant and nonmalignant cells (H). To confirm the IP enrichment with anti-EpCAM in serum, case samples were constructed by spiking a trace amount (5%) of tumorous EVs into the healthy human serum, as cancer patient serum mimicry. Case samples showed significantly higher EvIPThT readout than control (healthy serum) with anti-EpCAM but not found with anti-CD9 (FIG. 14 bottom). Without IP enrichment, ThT staining alone could not discriminate case and control (FIG. 15 bottom), revealing the significant effect of IP enrichment in the assay. These data validate that tumorous EV with higher BR can be enriched by anti-EpCAM in serum and thus highlighted the clinical potency of using EvIPThT to differentiate cancer patients from healthy subjects.

Figure 16:
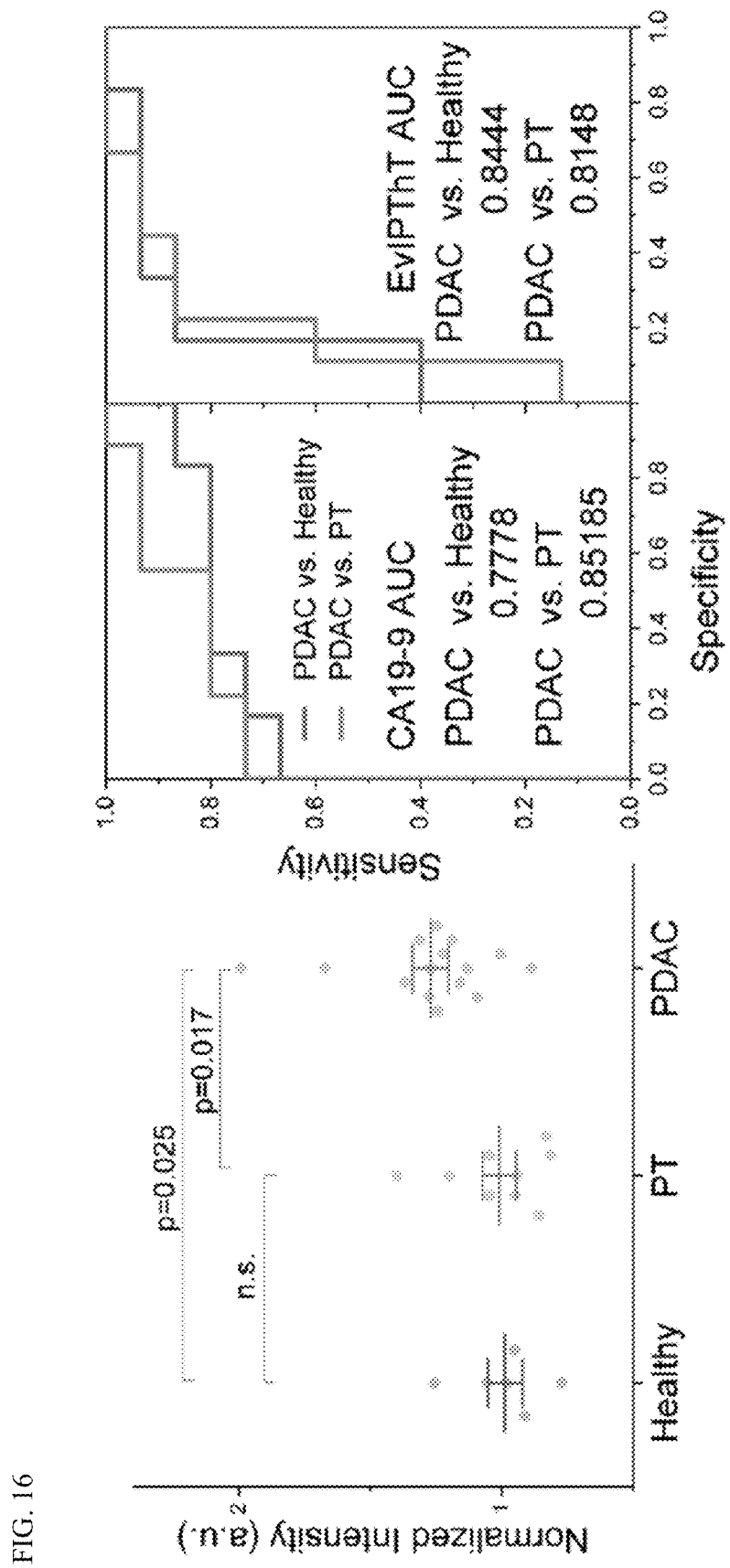
FIG. 16 shows EvIPThT readout in healthy donors, PDAC, and pancreatitis (PT) patients (n=6, 15, and 9, respectively) (Left), and ROC curve for EvIPThT from the pilot cohort (Right).
Figure 18:
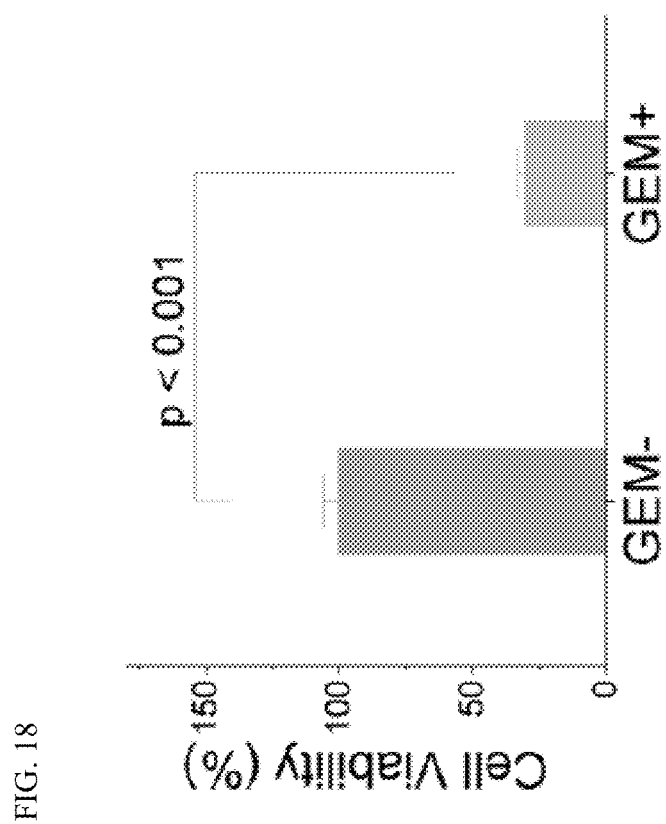
FIG. 18 shows viability of malignant (MIA) PaCa-2 cells with and without gemcitabine (GEM) treatment (50 μM).
Figure 19:
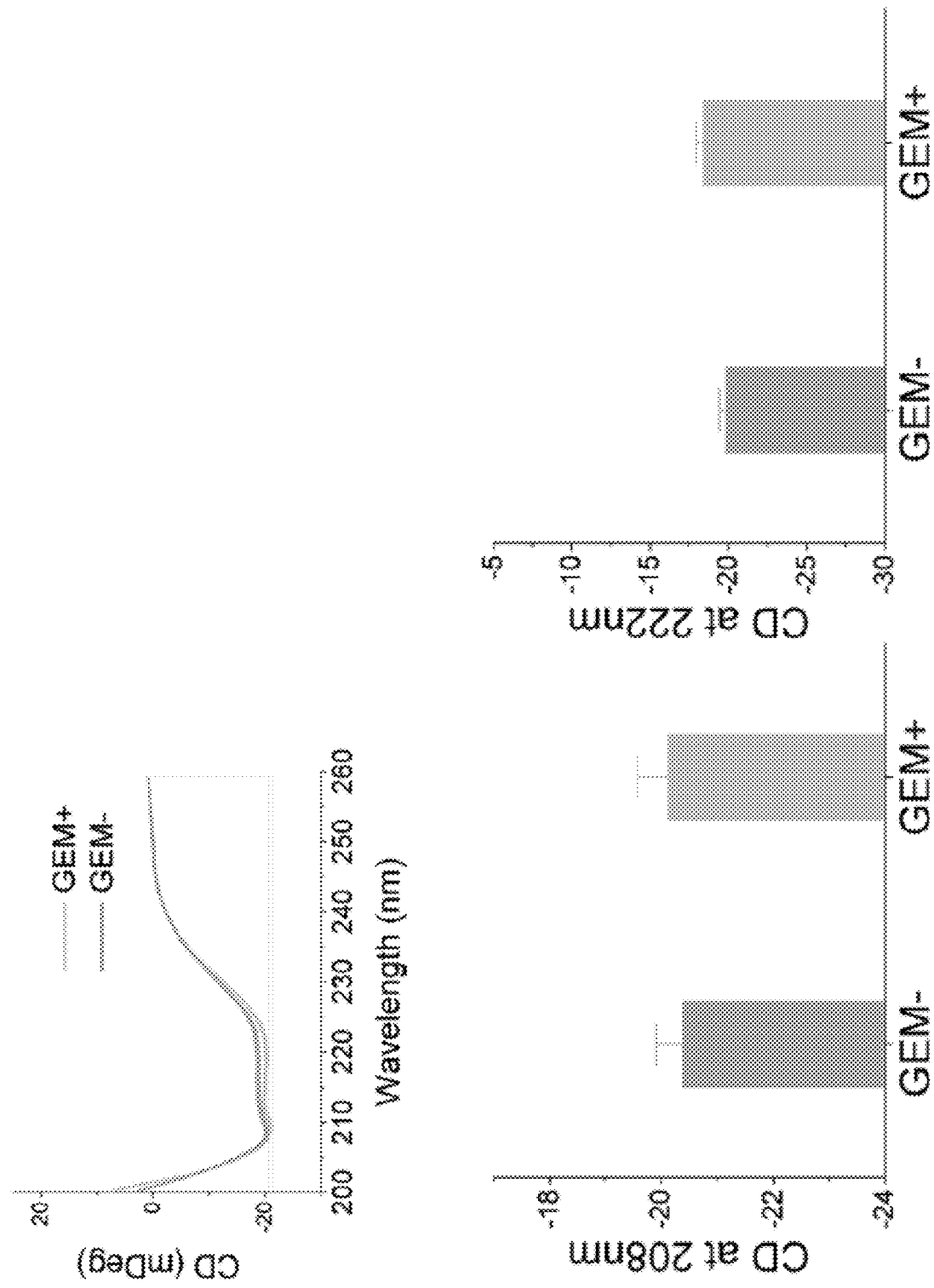
FIG. 19 shows circular dichroism (CD) spectra, peak value at 222 and 208 nm (due to $\pi \to \pi^*$ and $n \to \pi^*$ transition, respectively), of the MIA PaCa-2 cellular proteins' CD spectra at a protein concentration of 0.5 mg/mL.

We next conducted EvIPThT in a pilot cohort involving healthy control subjects, pancreatitis patients (PT), and pancreatic cancer (PDAC) patients with stage I-IV cancer. Analysis of the cohort revealed that the level of the EvIPThT readout distinguishes patients with histologically validated PDAC (n=15) from healthy donors (n=6) and patients with pancreatitis (PT; n=9; Table 1). The receiver operating characteristic (ROC) curves in FIG. 16 nominated EvIPThT readout as a potential classifier to distinguish PDAC cases from PT and healthy subjects (area under the curve, AUC, 0.84 vs 0.81). Compared with CA19-9, the clinical standard tumor prognosis marker for patients with PDAC,(56-58) EvIPThT assay was superior in distinguishing PDAC from healthy subjects (Table 2) but not PT. The EvIPThT level showed weak correlations to CA19-9 and CEA, suggesting a potential complementary method for diagnostics screening. CA19-9 and CEA are prevailing clinical prognosis markers, and their weak correlation to EvIPThT readout (FIG. 17) provides a hint that the secondary structure may not be affected by treatments. We, therefore, conducted in vitro treatment study. Malignant cells (MIA PaCa-2) treated with gemcitabine showed a dramatic decrease in viability (FIG. 18) but trivial CD spectrum change and thus the peak value at 222 and 208 nm (FIG. 19). These results confirmed the secondary structure might be irrelevant to treatment. High discriminatory power (PDAC vs healthy and PT), weak correlation to the pathological stage (AJCC), grade classifier, CA19-9 and CEA, and independence to treatment, together, suggested clinical application of EvIPThT in PDAC screening.

TABLE 1

Demographic characteristics of the clinical cohort

| Characteristics | Number (n = 30) | % |
|---|---|---|
| Age, years | | |
| Median(range) | 53 (35-69) | |
| Gender | | |
| Male | 16 | 53 |
| Female | 14 | 47 |
| Ethnicity | | |
| Caucasian | 30 | 100 |
| BMI | | |
| Median(range) | 25.65 (19.4-29.7) | |
| Diagnosis | | |
| PDAC | 15 | 50 |
| Pancreatitis | 9 | 30 |
| Healthy | 6 | 20 |
| CEA | | |
| Median (range) | 3.815 (1.25-48) | |
| CA19-9 | | |
| Median (range) | 0.5845 (0.41-149) | |
| Stage | | PDAC |
| IA | 1 | 6 |
| IB | 1 | 6 |
| IIA | 2 | 13 |
| IIB | 5 | 33 |
| IV | 3 | 10 |

TABLE 2

Accuracy of EvIPThT assay for screening PDAC from Healthy

| | Youden Index | Cut-off | Specificity | Sensitivity | Accuracy |
|---|---|---|---|---|---|
| EvIPThT | 0.70 | 0.25 | 0.83 | 0.87 | 0.86 |
| CA19-9 | 0.67 | 0.00 | 1.00 | 0.67 | 0.76 |

Discussion

Stereochemical properties play a prominent role in determining the function of the biomolecules and are widely used to evaluate the pharmacodynamic and pharmacokinetic properties of drugs, protein interactions, and the mechanisms of biorecognition.(59) With advanced X-ray diffraction and cryo-electron microscopy technology, the structures of numerous proteins have been determined at high resolution.(60) These structural explorations help in understanding the function of the proteins, however, presenting technical barriers for translational approaches. Intricate equipment, complex sample preparation process involving protein purification, and sophisticated operator necessity hindered the use of stereochemical information in clinical diagnosis and prognosis. Superior to the tertiary and quaternary structure of the proteins, which require elaborate measurement apparatus, the methods to evaluate the secondary structure are comparatively more accessible for clinical translation. Various direct and indirect approaches such as CD or nuclear magnetic resonance (NMR) are commonly used to explore the secondary structure.(61,62) However, the size, cost, and delicate nature of these systems limit their utility in field hospitals, clinical laboratories, and other settings where these factors become obstructive to translation. We studied the BR of EV proteins in relation to the malignancy because it can be captured noninvasively and quantified by fluorescence labeling, which is more feasible to be applied in clinical settings.

As shown in FIG. 10, a single protein marker is susceptible to other factors in the intricate protein-protein interactions, thus vulnerable to represent malignant cells' homeostasis with more complex interactions. This is the reason that we advocated collective attribute as a biomarker. Previously, we reported the nucleic acid-to-protein ratio of EV as a collective attribute for cancer detection.(41) In this study, we observed significant spectrometric differences (CD and FT-IR) between nonmalignant and malignant caused by β-sheets at both cellular and EV levels and further confirmed by fluorescence labeling. These experimental findings support the EV BR as a new noninvasive collective attribute marker.

Cancer cells exhibit an altered energy metabolism through aerobic glycolysis, even when provided with adequate oxygen. The alterations were considered to balance the need of the cell for energy with its equally important need for macromolecular building blocks and maintenance of redox balance.(63) Our observations provide a potential rationale for the superior energy demand of the cancer cells by protein folding. We found that malignant cells are richer in β-sheets and so is the exocytosis. Since β-sheets consume more energy to form the other secondary structures (α-helix and random coil), the biosynthesis of these (3-sheet-rich proteins thus cost more energy in malignant cells. Although it cannot rule out the tertiary and quaternary structure's impact, our secondary structural findings highlighted a new analysis bridging the energy metabolism and stereochemical information.

Warburg theory advocated that mitochondrial abnormity plays a vital role in the development and progression of cancer. In PDAC cells, the abnormity exhibits enhanced mitochondria activity.(64) In our previous studies, we identified superior mitochondrial mass in PDAC cells (PANC-1, BxPC3, and MIA PaCa-2) than nonmalignant cells (HPNE) .(41) Similarly, there are more mitochondrial DNA (mtDNA) in tumor cells at both the cellular and EV levels. Quantitatively elevated mitochondrial proteins from the proteomic study also featured the enhancement of mitochondrial activity in PDAC tumor cells. In this study, excessive β-sheet-rich mitochondrial proteins in malignant cells (FIG. 12) may serve as another manifestation of the Warburg effect.

Figure 11:
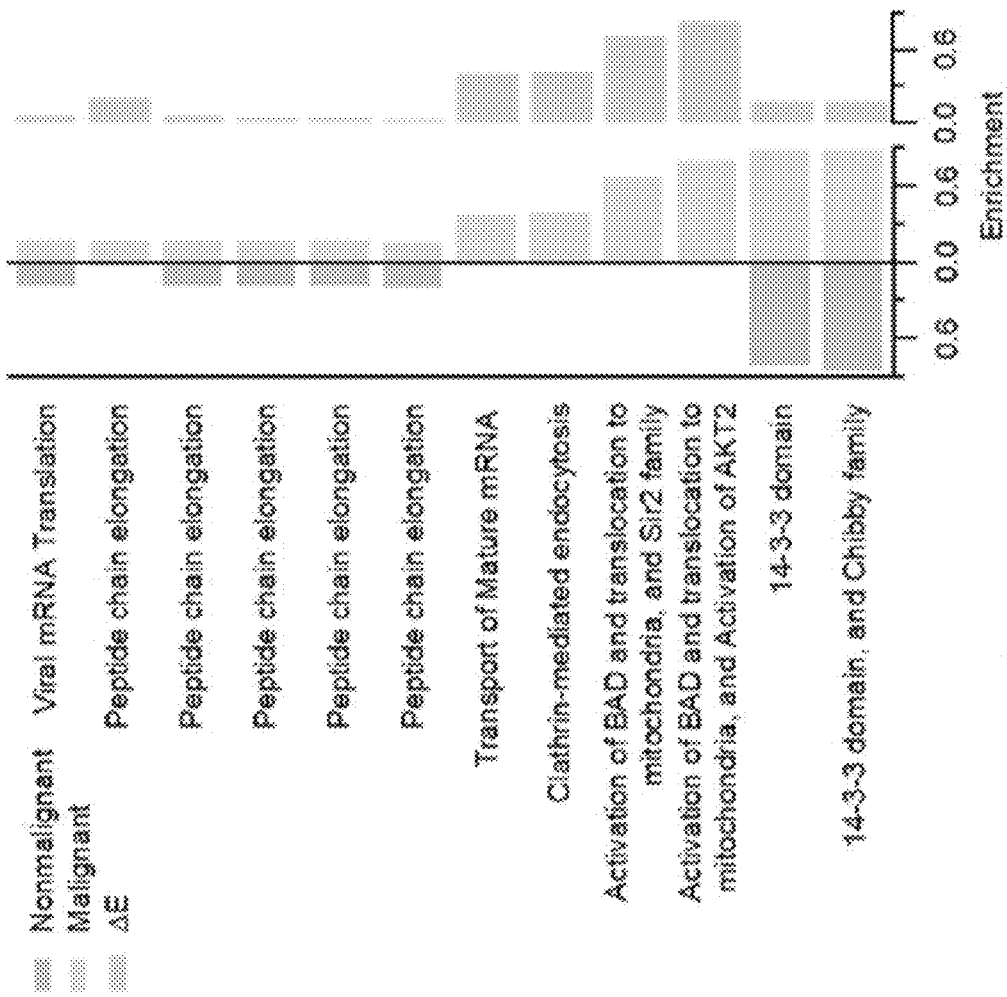
FIG. 11 shows comparative gene ontology (GO) term enrichment analysis result. ΔE denotes the enrichment score difference between malignant and nonmalignant cells. Terms in the local network cluster (LNC) category with ΔE>0 were shown. First column, nonmalignant; second column, malignant; third column, ΔE.
Figure 12:
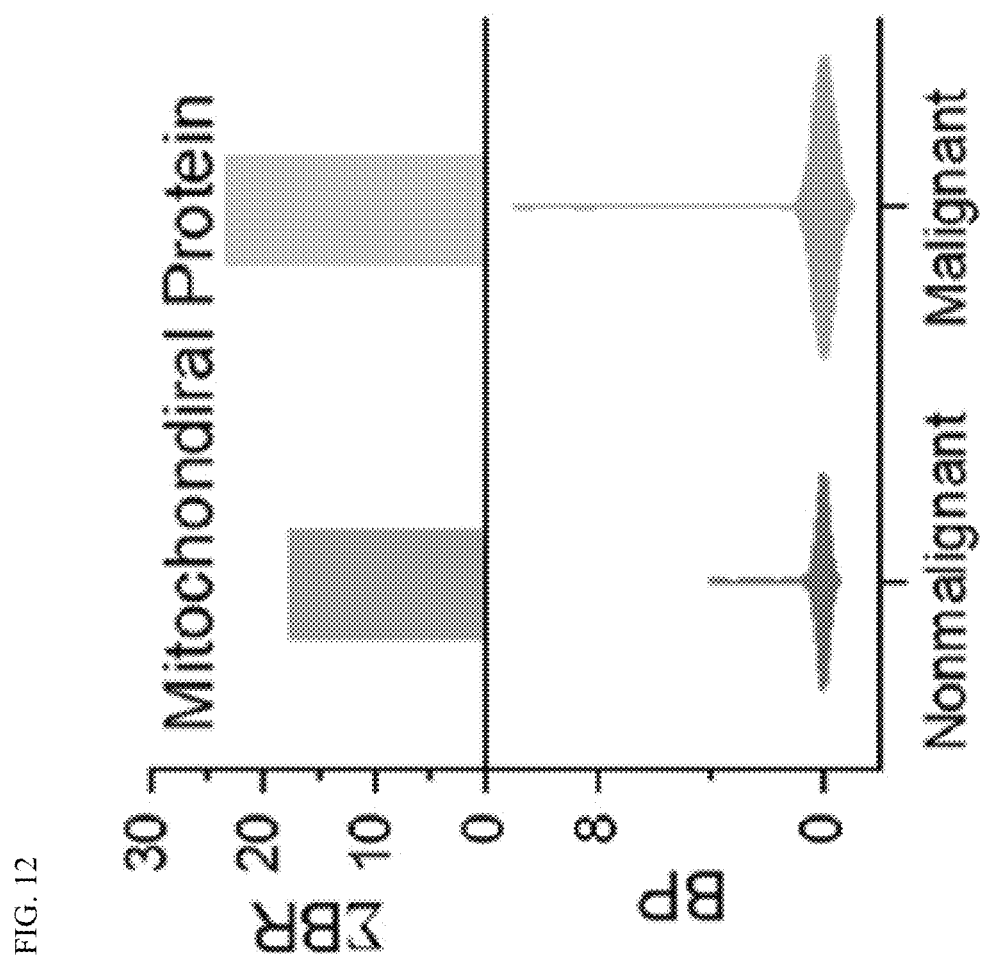
FIG. 12 shows BR (top) and BP distribution (bottom) of the mitochondrial proteins.

In the functional enrichment analysis, we observed β-sheet enrichment in the activation of BAD, regulating protein insertion into the mitochondrial membrane of tumor cells (FIG. 11). Thus, these signals related to the apoptosis activation require more energy to function in tumor cells, (44) setting a higher energy barrier for activating programmed cell death to facilitate unrestricted growth. Tumor cells evolve these β-sheet-rich signals as defects in apoptosis, which might provide a survival advantage in the metabolic catastrophe that promotes tumorigenesis.(63)

PDAC has a 5-year survival rate of less than 5%, which has remained unchanged over the past 25 years.(65) Despite intensively studied, none of the available biomarkers possess a sufficiently high accuracy to be implemented for PDAC screening, even in high-risk patients. Serum CA19-9 as the most common clinical biomarker with a sensitivity of 70-80% but specificity less than 50% is currently employed as a treatment efficacy marker for PDAC rather than a diagnostic marker because of its correlation to tumor size and stage.(66,67) Recently, many biomarkers such as CEA, CA242, CA-125, MUC-1, CEACAM1, MIC-1, MMP-9, Lectins, REG4, osteopontin, k-ras mutation, and gene methylation were assessed for PDAC diagnosis.(67-69) However, considering both performance and implementation, serum CA19-9, although not satisfying, remains dominant in clinical practice. There is a need for the development of noninvasive but highly discriminatory methods for the detection of PDAC. We developed the clinically oriented assay, EvIPThT, to use the BR of circulating tumorous EV for screening. The assay consisted of IP and fluorescence detection, which are both well-accepted clinical methods, to solve the technical challenges for the new screening markers. High discrimination power and irrelevancy to the treatment featured the new assay as a candidate for PDAC screening complementary to the prevalent CA19-9. Further study is necessary to determine whether the EV BR is a specified marker for PDAC, adenocarcinoma, or a pan-cancer marker. However, the assay is flexible by switching the IP antibody to accommodate different types of cancer screening.

In summary, we confirmed the BR of the tumorous EV through CD measurement, FT-IR, and fluorescence labeling (ThT) and validated the experimental findings by combining quantitative proteomics result with secondary structure information from bioinformatics and simulation studies. Furthermore, we developed the finding into a PDAC screening assay, EvIPThT, integrated IP for tumorous EV enrichment in liquid biopsy, and ThT staining for labeling β-sheets. The combination featured with significant time saving (<0.75 h) compared with other EV detection involving EV isolation (e.g., ultracentrifugation >3 h) and low sample consumption (100 μL serum). We found in our pilot study that EvIPThT readout presented high discriminatory power (PDAC vs healthy and PT) and weak correlations to the prognosis markers, indicating utility for cancer screening.

References for Example 1

(1) Camussi, G.; Deregibus, M. C.; Bruno, S.; Cantaluppi, V.; Biancone, L. Exosomes/Microvesicles as a Mechanism of Cell-to-Cell Communication. Kidney Int. 2010, 78, 838-848.
(2) Denzer, K.; Kleijmeer, M. J.; Heijnen, H. F.; Stoorvogel, W.; Geuze, H. J. Exosome: From Internal Vesicle of the Multivesicular Body to Intercellular Signaling Device. J. Cell Sci. 2000, 113, 3365-3374.
(3) Hannafon, B. N.; Ding, W.-Q. Cancer Stem Cells and Exosome Signaling. Stem Cell Invest. 2015, 2, 11.
(4) Valadi, H.; Ekström, K.; Bossios, A.; Sjöstrand, M.; Lee, J. J.; Lötvall, J. O. Exosome-Mediated Transfer of MRNAs and MicroRNAs Is a Novel Mechanism of Genetic Exchange between Cells. Nat. Cell Biol. 2007, 9, 654-659.
(5) Nazimek, K.; Ptak, W.; Nowak, B.; Ptak, M.; Askenase, P. W.; Bryniarski, K. Macrophages Play an Essential Role in Antigen-Specific Immune Suppression Mediated by t Cd8+ Cell-Derived Exosomes. Immunology 2015, 146, 23.
(6) Sung, B. H.; Ketova, T.; Hoshino, D.; Zijlstra, A.; Weaver, A. M. Directional Cell Movement through Tissues Is Controlled by Exosome Secretion. Nat. Commun. 2015, 6, 7164.
(7) Costa-Silva, B.; Aiello, N. M.; Ocean, A. J.; Singh, S.; Zhang, H.; Thakur, B. K.; Becker, A.; Hoshino, A.; Mark, M. T.; Molina, H.; Xiang, J.; Zhang, T.; Theilen, T.-M.; Garcia-Santos, G.; Williams, C.; Ararso, Y.; Huang, Y.; Rodrigues, G.; Shen, T.-L.; Labori, K. J.; Lothe, I. M. B.; Kure, E. H.; Hernandez, J.; Doussot, A.; Ebbesen, S. H.; Grandgenett, P. M.; Hollingsworth, M. A.; Jain, M.; Mallya, K.; Batra, S. K.; Jarnagin, W. R.; Schwartz, R. E.; Matei, I.; Peinado, H.; Stanger, B. Z.; Bromberg, J.; Lyden, D. Pancreatic Cancer Exosomes Initiate Pre-Metastatic Niche Formation in the Liver. Nat. Cell Biol. 2015, 17, 816-826.
(8) Yoshioka, Y.; Kosaka, N.; Konishi, Y.; Ohta, H.; Okamoto, H.; Sonoda, H.; Nonaka, R.; Yamamoto, H.; Ishii, H.; Mori, M.; Furuta, K.; Nakajima, T.; Hayashi, H.; Sugisaki, H.; Higashimoto, H.; Kato, T.; Takeshita, F.; Ochiya, T. Ultra-Sensitive Liquid Biopsy of Circulating Extracellular Vesicles Using ExoScreen. Nat. Commun. 2014, 5, 3591.
(9) McGuire, A.; Brown, J. A. L.; Kerin, M. J. Metastatic Breast Cancer: The Potential of MiRNA for Diagnosis and Treatment Monitoring. Cancer Metastasis Rev. 2015, 34, 145-155.
(10) Wang, X.; Zhong, W.; Bu, J.; Li, Y.; Li, R.; Nie, R.; Xiao, C.; Ma, K.; Huang, X.; Li, Y. Exosomal Protein CD82 as a Diagnostic Biomarker for Precision Medicine for Breast Cancer. Mol. Carcinog. 2019, 58, 674-685.
(11) Sheridan, C. Exosome Cancer Diagnostic Reaches Market. Nat. Biotechnol. 2016, 34, 359-360.
(12) Sun, D.; Yang, L.; Lyon, C. J.; Hu, T. Simulation-Directed Amplifiable Nanoparticle Enhanced Quantitative Scattering Assay under Low Magnification Dark Field Microscopy. J. Mater. Chem. B 2020, 8, 5416.
(13) Sun, D.; Fan, J.; Liu, C.; Liu, Y.; Bu, Y.; Lyon, C. J.; Hu, Y. Noise Reduction Method for Quantifying Nanoparticle Light Scattering in Low Magnification Dark-Field Microscope Far-Field Images. Anal. Chem. 2016, 88, 12001-12005.
(14) Sun, D.; Hu, T. Y. A Low Cost Mobile Phone Dark-Field Microscope for Nanoparticle-Based Quantitative Studies. Biosens. Bioelectron. 2018, 99, 513-518.
(15) Masyuk, A. I.; Masyuk, T. V.; Larusso, N. F. Exosomes in the Pathogenesis, Diagnostics and Therapeutics of Liver Diseases. J. Hepatol. 2013, 59, 621-625.
(16) He, W.; Kularatne, S. A.; Kalli, K. R.; Prendergast, F. G.; Amato, R. J.; Klee, G. G.; Hartmann, L. C.; Low, P. S. Quantitation of Circulating Tumor Cells in Blood Samples from Ovarian and Prostate Cancer Patients Using Tumor-Specific Fluorescent Ligands. Int. J. Cancer 2008, 123, 1968.

(17) Yang, K. S.; Im, H.; Hong, S.; Pergolini, I.; del Castillo, A. F.; Wang, R.; Clardy, S.; Huang, C.-H.; Pille, C.; Ferrone, S.; Yang, R.; Castro, C. M.; Lee, H.; del Castillo, C. F.; Weissleder, R. Multiparametric Plasma EV Profiling Facilitates Diagnosis of Pancreatic Malignancy. Sci. Transl. Med. 2017, 9, No. eaal3226.

(18) Qin, X.-L.; Wang, Z.-R.; Shi, J.-S.; Lu, M.; Wang, L.; He, Q.-R. Utility of Serum CA19-9 in Diagnosis of Cholangiocarcinoma: In Comparison with CEA. World J. Gastroenterol. 2004, 10, 427-432.

(19) Marrelli, D.; Caruso, S.; Pedrazzani, C.; Neri, A.; Fernandes, E.; Marini, M.; Pinto, E.; Roviello, F. CA19-9 Serum Levels in Obstructive Jaundice: Clinical Value in Benign and Malignant Conditions. Am. J. Surg. 2009, 198, 333-339.

(20) Lange, H.; Zuber, H.; Sement, F. M.; Chicher, J.; Kuhn, L.; Hammann, P.; Brunaud, V.; Bérard, C.; Bouteiller, N.; Balzergue, S.; Aubourg, S.; Martin-Magniette, M.-L.; Vaucheret, H.; Gagliardi, D. The RNA Helicases AtMTR4 and HEN2 Target Specific Subsets of Nuclear Transcripts for Degradation by the Nuclear Exosome in *Arabidopsis Thaliana*. PLoS Genet. 2014, 10, No. e1004564.

(21) Lubas, M.; Andersen, P. R.; Schein, A.; Dziembowski, A.; Kudla, G.; Jensen, T. H. The Human Nuclear Exosome Targeting Complex Is Loaded onto Newly Synthesized RNA to Direct Early Ribonucleolysis. Cell Rep. 2015, 10, 178-192.

(22) Im, H.; Shao, H.; Park, Y. I.; Peterson, V. M.; Castro, C. M.; Weissleder, R.; Lee, H. Label-Free Detection and Molecular Profiling of Exosomes with a Nano-Plasmonic Sensor. Nat. Biotechnol. 2014, 32, 490-495.

(23) Maas, S. L. N.; Broekman, M. L. D.; de Vrij, J. Tunable Resistive Pulse Sensing for the Characterization of Extracellular Vesicles. Methods Mol. Biol. 2017, 1545, 21-33.

(24) Coumans, F. A. W.; van der Pol, E.; Boing, A. N.; Hajji, N.; Sturk, G.; van Leeuwen, T. G.; Nieuwland, R. Reproducible Extracellular Vesicle Size and Concentration Determination with Tunable Resistive Pulse Sensing. J. Extracell. Vesicles 2014, 3, 25922.

(25) Momen-Heravi, F.; Balaj, L.; Alian, S.; Tigges, J.; Toxavidis, V.; Ericsson, M.; Distel, R. J.; Ivanov, A. R.; Skog, J.; Kuo, W. P. Alternative Methods for Characterization of Extracellular Vesicles. Front. Physiol. 2012, 3, 354.

(26) Gardiner, C.; Ferreira, Y. J.; Dragovic, R. A.; Redman, C. W. G.; Sargent, I. L. Extracellular vesicle sizing and enumeration by nanoparticle tracking analysis. J. Extracell. Vesicles 2013, 2, 19671.

(27) Bachurski, D.; Schuldner, M.; Nguyen, P.-H.; Malz, A.; Reiners, K. S.; Grenzi, P. C.; Babatz, F.; Schauss, A. C.; Hansen, H. P.; Hallek, M.; Pogge von Strandmann, E. Extracellular Vesicle Measurements with Nanoparticle Tracking Analysis—An Accuracy and Repeatability Comparison between NanoSight NS300 and ZetaView. J. Extracell. Vesicles 2019, 8, 1596016.

(28) Vestad, B.; Llorente, A.; Neurauter, A.; Phuyal, S.; Kierulf, B.; Kierulf, P.; Skotland, T.; Sandvig, K.; Haug, K. B. F.; Øvstebø, R. Size and concentration analyses of extracellular vesicles by nanoparticle tracking analysis: a variation study. J. Extracell. Vesicles 2017, 6, 1344087.

(29) Krafft, C.; Wilhelm, K.; Eremin, A.; Nestel, S.; von Bubnoff, N.; Schultze-Seemann, W.; Popp, J.; Nazarenko, I. A Specific Spectral Signature of Serum and Plasma-Derived Extracellular Vesicles for Cancer Screening. Nanomedicine 2017, 13, 835-841.

(30) Miles, A. J.; Wallace, B. A. Circular dichroism spectroscopy of membrane proteins. Chem. Soc. Rev. 2016, 45, 4859-4872.

(31) Greenfield, N. J. Using Circular Dichroism Spectra to Estimate Protein Secondary Structure. Nat. Protoc. 2007, 1, 2876-2890.

(32) Nagy, G.; Igaev, M.; Hoffmann, S. V.; Jones, N. C.; Grubmüller, H. SESCA: Predicting the Circular Dichroism Spectra of Proteins from Molecular Structure. J. Chem. Theory Comput. 2019, 15 (9), 5087-5102.

(33) Miles, A. J.; Wallace, B. A. Circular Dichroism Spectroscopy of Membrane Proteins. Chem. Soc. Rev. 2016, 45 (18), 4859-4872.

(34) Martz, E. Introduction to Proteins-Structure, Function, and Motion. Biochem. Mol. Biol. Educ. 2012, 40, 218.

(35) Fadaka, A.; Ajiboye, B.; Ojo, 0.; Adewale, 0.; Olayide, I.; Emuowhochere, R. Biology of Glucose Metabolization in Cancer Cells. J. Oncol. Sci. 2017, 3, 45-51.

(36) Yang, H.; Yang, S.; Kong, J.; Dong, A.; Yu, S. Obtaining Information about Protein Secondary Structures in Aqueous Solution Using Fourier Transform IR Spectroscopy. Nat. Protoc. 2015, 10, 382-396.

(37) Mihaly, J.; Deák, R.; Szigyártó, I. C.; Bóta, A.; Beke-Somfai, T.; Varga, Z. Characterization of Extracellular Vesicles by IR Spectroscopy: Fast and Simple Classification Based on Amide and C[Sbnd]H Stretching Vibrations. Biochim. Biophys. Acta, Biomembr. 2017, 1859, 459-466.

(38) Xue, C.; Lin, T. Y.; Chang, D.; Guo, Z. Thioflavin T as an amyloid dye: fibril quantification, optimal concentration and effect on aggregation. R. Soc. Open Sci. 2017, 4, 160696.

(39) Sulatskaya, A. I.; Lavysh, A. V.; Maskevich, A. A.; Kuznetsova, I. M.; Turoverov, K. K. Thioflavin T Fluoresces as Excimer in Highly Concentrated Aqueous Solutions and as Monomer Being Incorporated in Amyloid Fibrils. Sci. Rep. 2017, 7, 1-11.

(40) Passarella, D.; Goedert, M. Beta-Sheet Assembly of Tau and Neurodegeneration in Drosophila Melanogaster. Neurobiol. Aging 2018, 72, 98-105.

(41) Sun, D.; Zhao, Z.; Spiegel, S.; Liu, Y.; Fan, J.; Amrollahi, P.; Hu, J.; Lyon, C. J.; Wan, M.; Hu, T. Y. Dye-Free Spectrophotometric Measurement of Nucleic Acid-to-Protein Ratio for Cell-Selective Extracellular Vesicle Discrimination. Biosens. Bioelectron. 2021, 179, 113058.

(42) Szklarczyk, D.; Morris, J. H.; Cook, H.; Kuhn, M.; Wyder, S.; Simonovic, M.; Santos, A.; Doncheva, N. T.; Roth, A.; Bork, P.; Jensen, L. J.; von Mering, C. The STRING Database in 2017: Quality-Controlled Protein-Protein Association Networks, Made Broadly Accessible. Nucleic Acids Res. 2017, 45, D362-D368.

(43) Xu, H.-X.; Liu, L.; Xiang, J.-F.; Wang, W.-Q.; Qi, Z.-H.; Wu, C.-T.; Liu, C.; Long, J.; Xu, J.; Ni, Q.-X.; Yu, X.-J. Postoperative Serum CEA and CA125 Levels Are Supplementary to Perioperative CA19-9 Levels in Predicting Operative Outcomes of Pancreatic Ductal Adenocarcinoma. Surg 2017, 161, 373-384.

(44) Basu Mallik, S.; Jayashree, B. S.; Shenoy, R. R. Epigenetic Modulation of Macrophage Polarization-Perspectives in Diabetic Wounds. J. Diabetes Complicat. 2018, 32, 524-530.

(45) Carew, J. S.; Huang, P. Mitochondrial Defects in Cancer. Mol. Cancer 2002, 1, 9-12.

(46) Vyas, S.; Zaganjor, E.; Haigis, M. C. Mitochondria and Cancer. Cell 2016, 166, 555-566.

(47) Andre, F.; Schartz, N. E.; Movassagh, M.; Flament, C.; Pautier, P.; Morice, P.; Pomel, C.; Lhomme, C.; Escudier, B.; Le Chevalier, T.; Tursz, T.; Amigorena, S.; Raposo, G.; Angevin, E.; Zitvogel, L. Malignant Effusions and Immunogenic Tumour-Derived Exosomes. Lancet 2002, 360, 295-305.
(48) Maetzel, D.; Denzel, S.; Mack, B.; Canis, M.; Went, P.; Benk, M.; Kieu, C.; Papior, P.; Baeuerle, P. A.; Munz, M.; Gires, O. Nuclear Signalling by Tumour-Associated Antigen EpCAM. Nat. Cell Biol. 2009, 11, 162.
(49) Went, P. T. H.; Lugli, A.; Meier, S.; Bundi, M.; Mirlacher, M.; Sauter, G.; Dirnhofer, S. Frequent EpCam Protein Expression in Human Carcinomas. Hum. Pathol. 2004, 35, 122.
(50) Kosti, I.; Jain, N.; Aran, D.; Butte, A. J.; Sirota, M. Cross-Tissue Analysis of Gene and Protein Expression in Normal and Cancer Tissues. Sci. Rep. 2016, 6, 1-16.
(51) Zhang, J.; Li, S.; Li, L.; Li, M.; Guo, C.; Yao, J.; Mi, S. Exosome and Exosomal MicroRNA: Trafficking, Sorting, and Function. Genomics, Proteomics Bioinf. 2015, 13, 17-24.
(52) Li, A.; Zhang, T.; Zheng, M.; Liu, Y.; Chen, Z. Exosomal Proteins as Potential Markers of Tumor Diagnosis. J. Hematol. Oncol. 2017, 10, 1-9.
(53) Li, P.; Kaslan, M.; Lee, S. H.; Yao, J.; Gao, Z. Progress in Exosome Isolation Techniques. Theranostics 2017, 7, 789.
(54) Hurwitz, S. N.; Rider, M. A.; Bundy, J. L.; Liu, X.; Singh, R. K.; Meckes, D. G. Proteomic Profiling of NCI-60 Extracellular Vesicles Uncovers Common Protein Cargo and Cancer Type-Specific Biomarkers. Oncotarget 2016, 7, 86999-87015.
(55) Azmi, A. S.; Bao, B.; Sarkar, F. H. Exosomes in Cancer Development, Metastasis, and Drug Resistance: A Comprehensive Review. Cancer Metastasis Rev. 2013, 32, 623-642.
(56) Hess, V.; Glimelius, B.; Grawe, P.; Dietrich, D.; Bodoky, G.; Ruhstaller, T.; Bajetta, E.; Saletti, P.; Figer, A.; Scheithauer, W.; Herrmann, R. CA 19-9 Tumour-Marker Response to Chemotherapy in Patients with Advanced Pancreatic Cancer Enrolled in a Randomised Controlled Trial. Lancet Oncol. 2008, 9, 132.
(57) E. Poruk, K.; Brown, K.; M. Boucher, K.; L. Scaife, C.; J. Mulvihill, S. The Clinical Utility of CA 19-9 in Pancreatic Adenocarcinoma: Diagnostic and Prognostic Updates. Curr. Mol. Med. 2013, 13, 340-351.
(58) Distler, M.; Pilarsky, E.; Kersting, S.; Grützmann, R. Preoperative CEA and CA 19-9 Are Prognostic Markers for Survival after Curative Resection for Ductal Adenocarcinoma of the Pancreas—A Retrospective Tumor Marker Prognostic Study. Int. J. Surg. 2013, 11, 1067-1072.
(59) Bertucci, C.; Pistolozzi, M.; De Simone, A. Circular Dichroism in Drug Discovery and Development: An Abridged Review. Anal. Bioanal. Chem. 2010, 398, 155-166.
(60) Shoemaker, S. C.; Ando, N. X-rays in the Cryo-Electron Microscopy Era: Structural Biology's Dynamic Future. Biochemistry 2018, 57, 277-285.
(61) Böselt, L.; Sidler, D.; Kittelmann, T.; Stohner, J.; Zindel, D.; Wagner, T.; Riniker, S. Determination of Absolute Stereochemistry of Flexible Molecules Using a Vibrational Circular Dichroism Spectra Alignment Algorithm. J. Chem. Inf. Model. 2019, 59, 1826.
(62) Pelton, J. T.; McLean, L. R. Spectroscopic Methods for Analysis of Protein Secondary Structure. Anal. Biochem. 2000, 277, 167-176.
(63) Cairns, R. A.; Harris, I. S.; Mak, T. W. Regulation of Cancer Cell Metabolism. Nat. Rev. Cancer 2011, 11, 85-95.
(64) Bryant, K. L.; Mancias, J. D.; Kimmelman, A. C.; Der, C. J. KRAS: Feeding Pancreatic Cancer Proliferation. Trends Biochem. Sci. 2014, 39, 91-100.
(65) Lockhart, A. C.; Rothenberg, M. L.; Berlin, J. D. Treatment for Pancreatic Cancer: Current Therapy and Continued Progress. Gastroenterology 2005, 128, 1642-1654.
(66) Pfister, M.; Gottstein, B.; Kretschmer, R.; Cerny, T.; Cerny, A. Elevated Carbohydrate Antigen 19-9 (CA 19-9) in Patients with *Echinococcus* Infection. Clin. Chem. Lab. Med. 2001, 39, 527-530.
(67) Liu, J.; Gao, J.; Du, Y.; Li, Z.; Ren, Y.; Gu, J.; Wang, X.; Gong, Y.; Wang, W.; Kong, X. Combination of Plasma MicroRNAs with Serum CA19-9 for Early Detection of Pancreatic Cancer. Int. J. Cancer 2012, 131, 683-691.
(68) Chari, S. T.; Kelly, K.; Hollingsworth, M. A.; Thayer, S. P.; Ahlquist, D. A.; Andersen, D. K.; Batra, S. K.; Brentnall, T. A.; Canto, M.; Cleeter, D. F.; Firpo, M. A.; Gambhir, S. S.; Go, V. L. W.; Hines, 0. J.; Kenner, B. J.; Klimstra, D. S.; Lerch, M. M.; Levy, M. J.; Maitra, A.; Mulvihill, S. J.; Petersen, G. M.; Rhim, A. D.; Simeone, D. M.; Srivastava, S.; Tanaka, M.; Vinik, A. I.; Wong, D. Early Detection of Sporadic Pancreatic Cancer. Pancreas 2015, 44, 693-712.
(69) Warton, K.; Samimi, G. Methylation of Cell-Free Circulating DNA in the Diagnosis of Cancer. Front. Mol. Biosci. 2015, 2, 1-10.

Example 2

Materials and Methods for Example 1
Cell Lines and Cell Culture

The human pancreatic cancer cell lines PANC-1, MIA PaCa-2, and the human pancreas cell line HPNE were obtained from the American Type Culture Collection (Manassas, Virginia). PANC-1, and MIA PaCa-2 cells were cultured in DMEM medium (Hyclone, GE Healthcare Life Sciences), and HPNE cells were cultured in DMEM (Hyclone, GE Healthcare Life Sciences) with 0.1 ng/mL EGF (Novus Biologicals, USA). All cultures except non-starvation condition were supplemented with 10% fetal bovine serum (FBS; Life technology, Thermo Scientific Inc.), penicillin (1 U) and streptomycin (1 µg/mL). All cells were maintained in a humidified incubator with 5% CO2 at 37° C. All cell lines were cultured in triplicate under the same conditions and then harvested to collect independent EV samples.

EV Isolation from Culture Media

Figure 21:
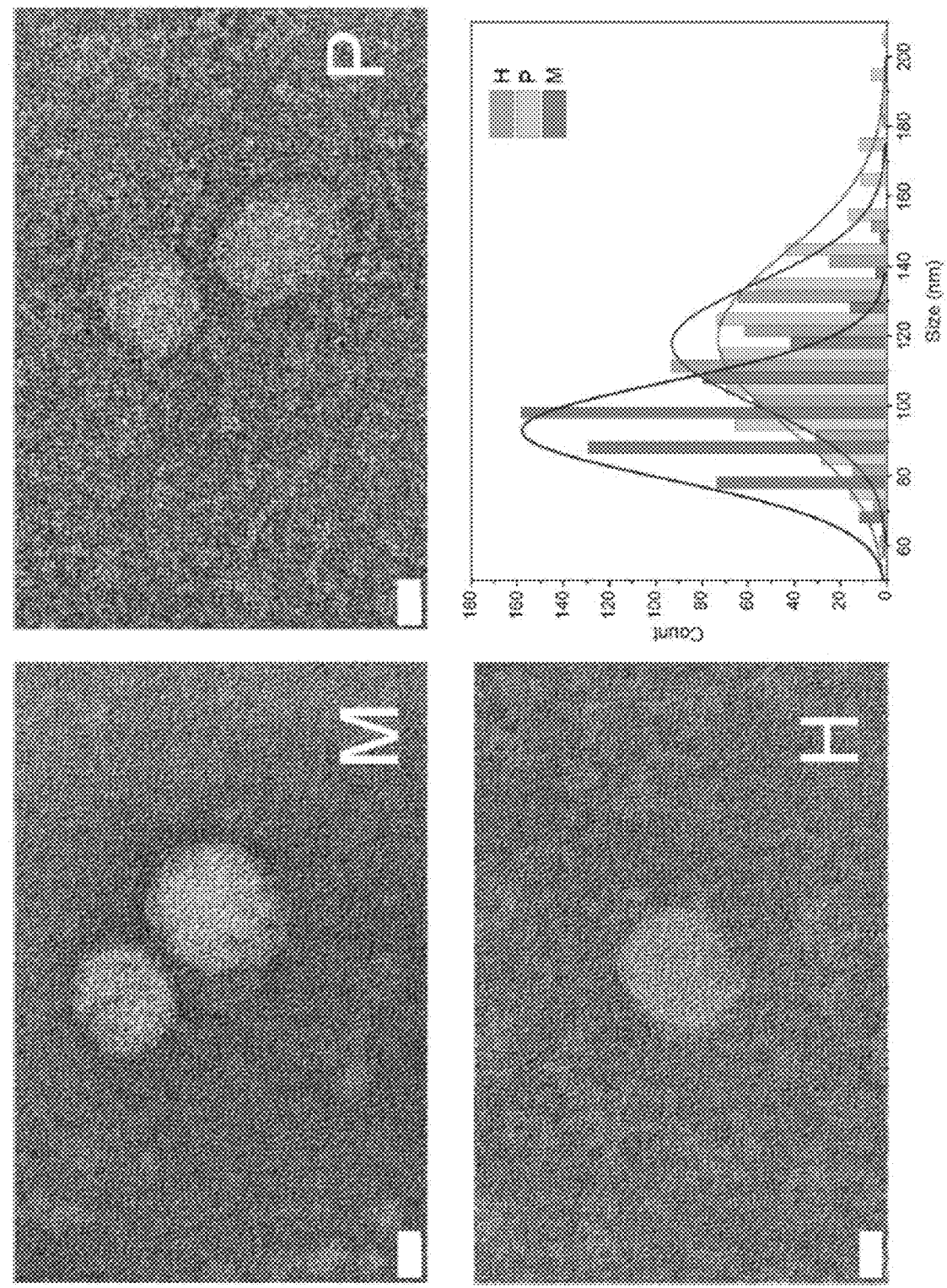
FIG. 21 shows TEM images and unimodal size distributions of purified EVs from cell culture. Scale bar: 10 nm, H: HPNE; M: MIA PaCa-2; P: PANC-1.
Figure 23:
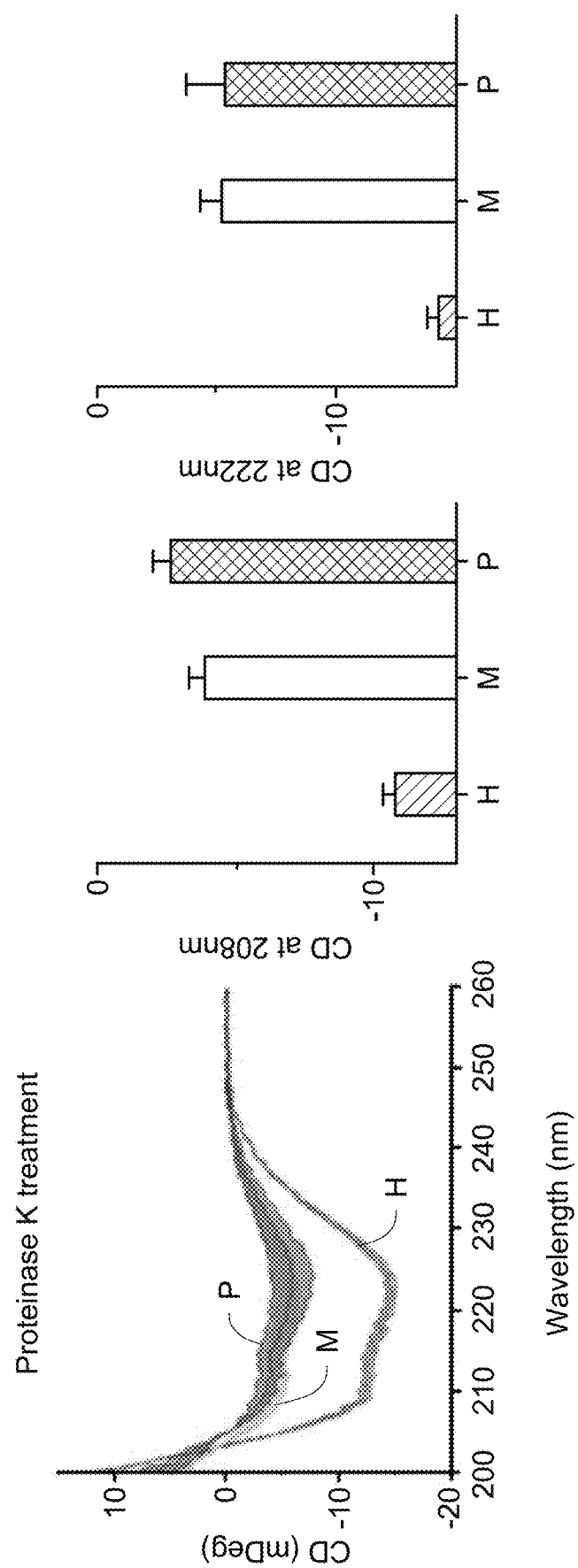
FIG. 23 show the impact of extravesicular protein contamination. After proteinase K treatment, the spectrum difference between malignant and nonmalignant EV persists. Circular dichroism spectra, peak value at 222 nm and 208 nm (due to $\pi \to \pi n^*$ and $n \to \pi^*$ transition respectively) of the EV proteins' CD spectra at a protein concentration of 0.5 mg/ml.

Cells were grown in culture media with serum until reached to $10^7$ cells, washed two times with phosphate-buffered saline (PBS) (pH 7.0). For non-starvation collection, the cells were culture in medium with 10% EV-depleted FBS (Thermo Scientific, US) for 48 hrs. Culture supernatants were then filtered by 0.2 µm filter and centrifuged at 10,000 g for 30 min to remove cell debris. The supernatant was carefully centrifuged at 200,000 g for 70 min. Resulting EV precipitates were collected, dissolved in 100 µL PBS (pH 7.0), and stored at 4° C. TEM (JEOL JEM-2100), and a tunable resistive pulse sensing instrument (qNano system; IZON Science Ltd, Christchurch, New Zealand) were used to validate EV samples (FIG. 21). To remove extravescile contamination, 1 µL proteinase K (8 U/mL, New England Biolabs) was added to the samples, and incubated at 37° C. for 30 min. 1 µL phenylmethyl sulfonyl fluoride (1 mM) was then added and incubated at room temperature for 10 min to stop the digestion. The proteinase K was removed by Ultra-0.5 centrifugal filter device (50,000 NMWL, Amicon). The impact of extravesicular protein contamination was shown in FIG. 23.

EvIPThT Assay

For the spike-in experiment, 5% tumorous EVs were spiked into 200 μL healthy serum as case, and 200 μl healthy serum as control. 100 μl Invitrogen™ exosome human CD9 isolation solution or exosome human EpCAM isolation beads (Invitrogen, USA) was washed with PBS and resolved in 400 μL PBS. Serum samples and 100 μL beads were incubated for 2 hrs. at room temperature with proper shaking (Hula Mixer, Thermo Fisher, USA). After PBS wash, the beads were solved in 20 μL lysis buffer (Sigma-Aldrich, USA) for 15 min. Collected the supernatant, and the protein level was then evaluated by evaluating absorption at 280 nm using Nanodrop. 35 μL PBS was added to the supernatant, and 50 μL sample and 50 μL ThT solution (70 μM) was added to 96 well plate and incubated 30 min avoiding light before reading out with the plate reader. The final fluorescence intensity was normalized by the PBS blank with assigned ThT concentration. The quantitative characteristics of the assay were summarized in Table 3.

TABLE 3

Characteristics of EvIPThT assay

Figure 24:
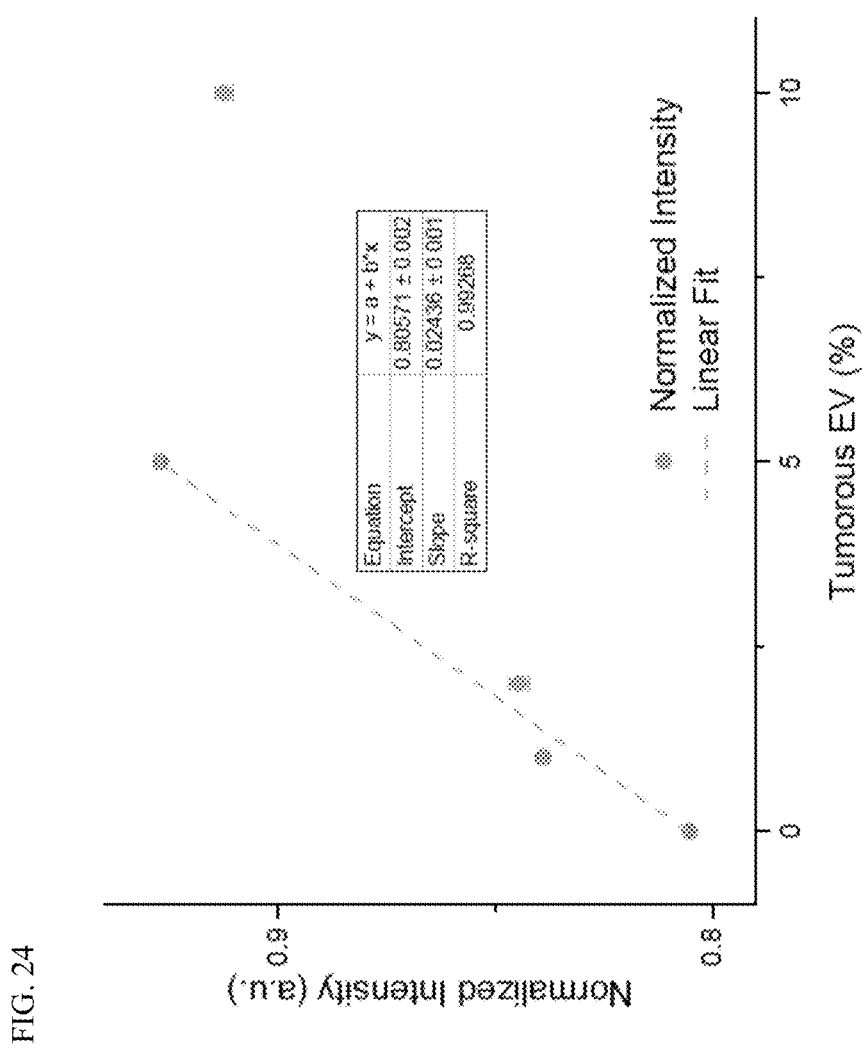
FIG. 24 shows linear response of EvIPThT. Tumorous EV was spiked into the healthy human serum to designated protein percentage. The assay readout was linear <5%, and saturated beyond. Error bars, mean±s.e.m; n=5.

| Characteristics | Value |
| --- | --- |
| Coefficient of variation (CV) | Positive: 16% Negative: 14% |
| Limits of detection (LOD) | 0.5% |
| Limits of quantification (LOQ) | 1.83% |
| Linear range | 0~5% (FIG. 24) |
| Diagnostic Specificity | 0.83 |
| Diagnostic Sensitivity | 0.87 |
| Diagnostic Accuracy | 0.86 |
| Turnaround time | 0.75 hr. |
| Cost per sample | $6 |

Circular Dichroism Measurements

The circular dichroism (CD) spectra were recorded on a Jasco J-815 spectropolarimeter (Tokyo, Japan), using a cylindrical cuvette with 0.1 cm path length. The light source system was protected by nitrogen (flow rate: 5 L/min). Proteins were obtained from cell lysate using a lysis kit (C2978, Sigma-Aldrich) following the manufacture protocol. The samples' protein contents were quantified by absorption at 280 nm in a Nanodrop ND-1000 spectrophotometer (Thermo Scientific) and diluted to 0.2 mg/ml before CD scanned at 200 nm/min in the wavelength region of 200-260 nm. Three scans were averaged for each CD spectrum. Data were analyzed and processed using the Jasco Spectra Manager 2 software package.

Flow Cytometry

Cells were stained by ThT. Briefly, the cells in the culture dish were treated with 2.0 mL of Trypsin-EDTA solution for 3 min at 37° C., and 2 mL growth medium were added after. The cell suspensions were centrifuged to obtain the cell pellet and washed three times with PBS before incubated for 20 minutes at 37° C. in 100 μM dye. The stained cells were washed three times before diluting to 300 μL in FACS tubes. Unstained cells were used as negative controls. Cells were then subjected to flow cytometric analysis using a BD Accuri™ C6 (BD Bioscience). At least 10,000 cells were acquired from each sample. FITC channel was used to capture signal from the ThT. Flowing Software (Turku Centre from Biotechnology) was used for analysis of the cytometric data. We defined the target cell populations based on negative control. The intensity was normalized to the mean of the control.

Attenuated Total Reflection Fourier-Transform Infrared Spectroscopy (ATR-FTIR)

ATR-FTIR spectra were collected using a Vertex 70 Fourier Transform Infrared Spectrometer (Bruker Optics, USA) equipped with a liquid nitrogen cooled mercury-cadmium-telluride (MCT)

detector and with a 'Golden Gate' single reflection diamond ATR accessory. All samples were diluted to the same protein level (0.5 mg/mL) before testing. 5 μL of sample was mounted on the diamond ATR crystal under ambient conditions. The measurements were performed at room temperature, immediately after sample loading. 100 scans were co-added at a nominal resolution of 4 cm-1. After each data acquisition ATR correction was performed. For all spectral manipulation, the OPUS™ and OPUSLab™ software package (Bruker Optics, USA) was used. The secondary derivative evaluation following a well-developed protocol. Briefly, Calculation of the second derivative with a seven-pint Savitsky-Golay smoothing; Subtraction of PBS buffer as a blank spectrum; Determination of protein content by integrated intensity of α-helix band with a peak at 1653 cm-1 as Aα and β-sheet with a peak at 1633 and 1644 as Aβ. Calculation of 'spectroscopic β-to-α ratio': β/α=Aβ/Aα.

Thioflavin T (ThT) Staining Assay

Figure 22A:
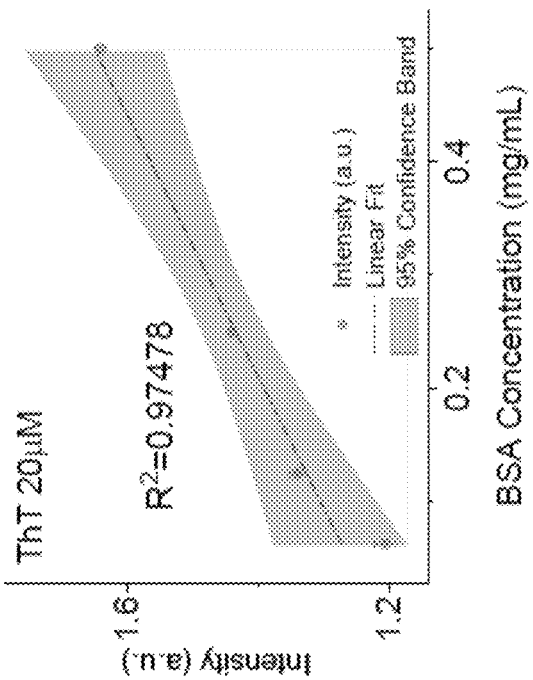
FIGS. 22A-C show the dynamic range and linearity of ThT staining.
Figure 22B:
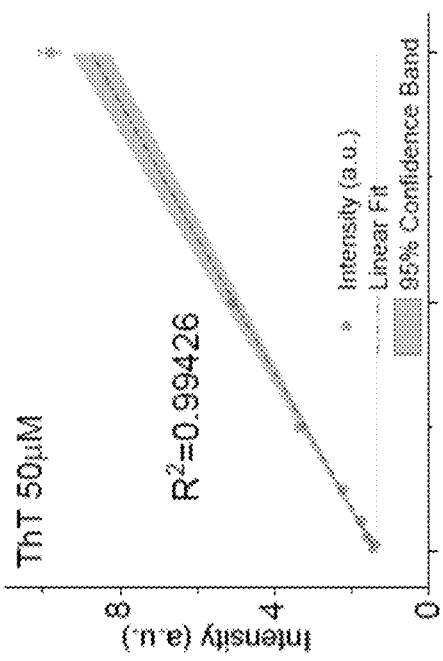
Figure 22C:
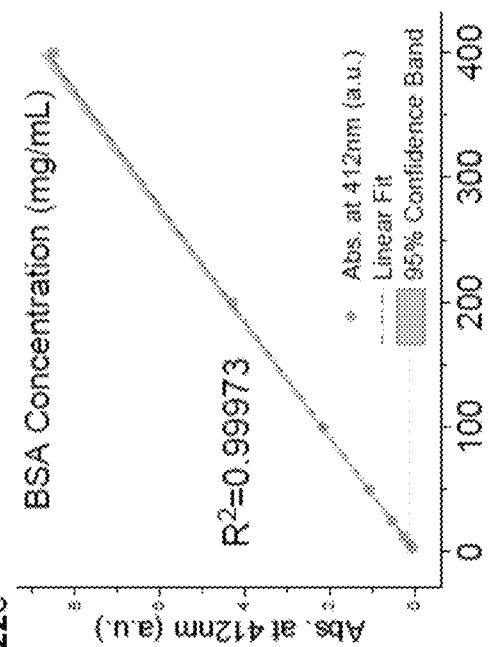

Thioflavin T (ThT) were purchased from Santa Cruz Biotechnology (sc-359849). 4 mM Stock concentrations of ThT were made with PBS and filtered with a 2 μm syringe filter, and stored at 4° C. Before testing the samples, the dynamic range and linearity of the ThT staining were determined (FIG. 22). The concentration gradients (0.01 to 1 mg/mL) of Bovine Serum Albumin (BSA) was created, and tested by ThT staining following the protocol: 50 μL 40 μM ThT solution in PBS is incubated with 50 μL sample for 15 min, and monitored in a fluorescence plate reader (excitation 440 nm/emission 490 nm)(1). 50 μL of samples were stained for 30 min at room temperature with a ThT final concentration of 35 μM in a black 96-well microplate. The ThT fluorescence was measured at room temperature using a Synergy H1 Hybrid Multi-Mode Reader (BioTek, USA) through the top of the plate with excitation filter of 450 nm and emission filter of 482 nm. The concentration of ThT in solutions was determined with a spectrophotometer, using Beer's law and a molar extinction coefficient of ε412=31600/M·cm(2,3).

Proteomics Analyses

Comparative proteomics analysis was conducted by reanalyzing LC-MS/MS results from our previous study (4). Briefly, HPNE and MIA PaCa-2 cell and EV lysates were diluted to 1 μg/μL with 100 mM NH4 HCO3 supplemented with 10 mM dithiothreitol, incubated at 37° C. for 1 h, then mixed with 30 mM iodoacetamide, incubated in the dark for 30 min at room temperature before overnight digestion with 1 μg trypsin at 37° C. Digestions were terminated by the addition of 0.1% trifluoroacetic acid and diluted to 0.25 μg/μL protein with H2O/acetonitrile (95:5), centrifuged at 21,000 g for 20 min, and processed using ZipTip columns (Thermo Scientific) for salt removal prior to LC-MS/MS analyses that employed 5 μL of sample/injection. Samples were analyzed using an Orbitrap Fusion™ Lumos™ Tribrid™ Mass Spectrometer (Thermo Scientific). Survey scans were collected from 500-2000 Th with an AGC target of 500 000, a resolution of 120 000 at 200 m/z, and 4 µscans averaged per spectrum. MS/MS scans were collected with a resolution of 60 000 at 200 m/z, with 4 µscans averaged per spectrum, an AGC target of 500 000, and a maximum injection time of 118 ms. All resulting MS/MS spectra were used to search Proteome Discoverer™ Software (Thermo Scientific), using a measurement tolerance of 0.5 Da. Bioinformatics The proteomics study provides lists of proteins with accession IDs that each point to a record in the protein databases. UniProt (www_uniprot_org), a high-quality database releasing structure information of protein, was accessed for the protein structural information. R package "rvest" is used to extract secondary structure information of the proteins from UniProt database. Briefly, URL link was generated with accession ID for each protein following UniProt format. The HTML response from the target URL was then read ("read_html") and analyzed ("read_node"). Detailed table of secondary structure, primary sequence and the sequence length were unwrapped using their corresponding xpath selectors ("read_table" and "read_text"). The location and length of the secondary structure (beta-strand, helix, and turn) segments of the protein extracted from the table were used to calculate the percentage of each secondary structure type. By analyzing the structure of each protein, the β-sheet percentage (BP) of the protein was defined as: the length of β-sheet sequence divided by the total length of the protein. In cases that structural information for the integrated protein is not available, an estimator P, defined as the percentage of the known structure partial over the protein's full length, was calculated.

Protein Folding Simulation

The primary sequences of the proteins obtained from the proteomics study were retrieved from Uniprot by a getUniProt function in R package "UniprotR". The sequences were folded with PPSPred(5), a machine-learning algorithm for structural prediction. The Perl based algorithm was performed parallelly using high-performance computing resources at North Dakota State University Center for Computationally Assisted Science and Technology (CCAST). The β-sheets percentage of each sequence was extracted from the output files of the simulation.

Protein-Protein Interaction and Enrichment Analysis

Protein-protein interaction results using the STRING database (string-db.org). The STRING interaction map was generated using default settings (medium confidence of 0.400; criteria for linkages are neighborhood, gene fusion, co-occurrence, co-expression, experiments, databases and text mining). We constructed a PPI network using the Cytoscape software 3.8.1(6) to visualize their interactions based on our relative quantity (Q), BP result data and PPI score. The GO term enrichment was analyzed with STRING functional enrichment analysis(7) inputting IDs and corresponding BR values.

Western Blotting

Cells (2×106), EVs were collected and lysed with 100 µL lysis buffer for 30 min. Total proteins of each sample were quantified by BCA. After the addition of a loading buffer containing 0.125 M Tris-HCl, pH 6.8, 4% SDS, 20% glycerol, 10% 2-mercaptoethanol, 0.004% bromophenol blue, an equal amount of protein for each sample was separated by 12% SDS-PAGE and transferred to a PVDF membrane (BioRad). Incubation was conducted in diluted primary antibodies to EpCAM, CD9 (Santa Cruz) at 4° C. overnight. Then, membranes were probed with HRP-conjugated secondary antibody (Dako), and signals were visualized using an enhanced chemiluminescence reagent (Luminol).

Gemcitabine Treatment

Cells were seeded in 96-well plates at a density of 104 cells/well. After 24 hr., the medium of treatment group was replaced with medium supplemented with 20 µM gemcitabine for 48 hr. Cell viability was accessed by CCK-8 assay following the manufacturer's instructions. Briefly, a mixture of 10 µL of CCK-8 and 190 µL media was added into each well, and the cells were incubated for another 1 hr. The absorbance of each well was measured at 450 nm using a microplate reader. Each experiment was performed in 6 repeats.

Statistics

Comparisons between two groups were performed using an unpaired two-tailed Mann-Whitney Utest (unpaired samples), a paired two-tailed Mann-Whitney U-test (paired samples), and a twotailed Student's t-test (normally distributed parameters). Multiple samples were compared using a Sidak multiple comparison test, Kruskal-Wallis test (nongrouped) and ANOVA with Friedman test for multiple comparisons (grouped). All comparison groups had equivalent variances. $p<0.05$ was considered to be statistically significant. Data analysis was performed using Oroign Pro software. Data are presented either as representative examples or means±SEM of 3+ experiments. p values were obtained using unpaired two-tailed Student's t test or two-way ANOVA. $*p<0.05$, $p<0.01$, and $*p<0.001$, $****p<0.0001$. The cutoff values were estimated at various sensitivities and specificities and determined at the maximum Youden index value, that is, sensitivity+specificity−1 (8). The diagnostic accuracy of tests were evaluated using: Accuracy=(sensitivity)(prevalence)+(specificity)(1−prevalence)(9).

Code Availability

R and Perl code as described in the manuscript is available at GitHub at github.com/biosunlab/EvIPThT. Additional reasonable requests for code will be promptly reviewed by the senior authors to verify whether the request is subject to any intellectual property or confidentiality obligations, and shared to the extent permissible by these obligations.

Patient Samples

The goal of this study was to validate the hypothesis that tumorous cells and EVs are beta-sheet rich compared with their normal counterparts and demonstrate the clinical potential for cancer screening. All serum samples were obtained from ProteoGenex (ProteoGenex Inc., Culver City, CA) following a study protocol approved by the Russian Oncological Research Center ethic committee (No.: PG-ONC 2003/1), after obtaining informed written consent. Tumors from PDAC patients were subjected to pathological re-review and histological confirmation by two expert PDAC pathologists. A total of 15 PDAC patients (10 males and 5 females with an age range of 48-69 years old) and 6 healthy donors and 9 disease control (pancreatitis) were included in the present study. The patients' information, clinical diagnosis, TNM, and staging system of the world health organization and tumor grade established by histopathological evaluation are included in Table 1. The serum samples were stored in Nalgene storage cryogenic. The CA19-9 concentration was remeasured by a commercially available enzyme immunoassay (#EHCA199, Thermo Fisher Scientific) according to the manufacturer's protocols.

Examples 1 and 2 are also available as Rasuleva et al., 2021, ACS Sens., 2021, 6:4489-4498.

References for Example 2

(1) Shimanovich, U.; Michaels, T. C. T.; De Genst, E.; Matak-Vinkovic, D.; Dobson, C. M.; Knowles, T. P. J.

Sequential Release of Proteins from Structured Multishell Microcapsules. Biomacromolecules 2017, 18 (10), 3052-3059. doi.org/10.1021/acs.biomac.7b00351.
(2) Sulatskaya, A. I.; Lavysh, A. V.; Maskevich, A. A.; Kuznetsova, I. M.; Turoverov, K. K. Thioflavin T Fluoresces as Excimer in Highly Concentrated Aqueous Solutions and as Monomer Being Incorporated in Amyloid Fibrils. Sci. Rep. 2017, 7 (1), 1-11. doi.org/10.1038/s41598-017-02237-7.
(3) Chan, C. X. J.; Joseph, I. G.; Huang, A.; Jackson, D. N.; Lipke, P. N. Quantitative Analyses of Force-Induced Amyloid Formation in Candida Albicans Als5p: Activation by Standard Laboratory Procedures. PLoS One 2015, 10 (6), 1-13. doi.org/10.1371/journal.pone.0129152.
(4) Sun, D.; Zhao, Z.; Spiegel, S.; Liu, Y.; Fan, J.; Amrollahi, P.; Hu, J.; Lyon, C. J.; Wan, M.; Hu, T. Y. Dye-Free Spectrophotometric Measurement of Nucleic Acid-to-Protein Ratio for Cell-Selective Extracellular Vesicle Discrimination. Biosens. Bioelectron. 2021, 113058. doi.org/10.1016/j.bios.2021.113058.
(5) Yan, R.; Xu, D.; Yang, J.; Walker, S.; Zhang, Y. A Comparative Assessment and Analysis of 20 Representative Sequence Alignment Methods for Protein Structure Prediction. Sci. Rep. 2013, 3. doi.org/10.1038/srep02619.
(6) Shannon, P.; Markiel, A.; Ozier, O.; Baliga, N. S.; Wang, J. T.; Ramage, D.; Amin, N.; Schwikowski, B.; Ideker, T. Cytoscape: A Software Environment for Integrated Models of Biomolecular Interaction Networks. Genome Res. 2003. doi.org/10.1101/gr.1239303.
(7) Szklarczyk, D.; Gable, A. L.; Lyon, D.; Junge, A.; Wyder, S.; Huerta-Cepas, J.; Simonovic, M.; Doncheva, N. T.; Morris, J. H.; Bork, P.; Jensen, L. J.; Von Mering, C. STRING V11: Protein-Protein Association Networks with Increased Coverage, Supporting Functional Discovery in Genome-Wide Experimental Datasets. Nucleic Acids Res. 2019, 47 (D1), D607-D613. doi.org/10.1093/nar/gky1131.
(8) Youden, W. J. Index for Rating Diagnostic Tests. Cancer 1950. doi.org/10.1002/1097-0142 (1950)3:1<32::AID-CNCR2820030106>3.0.00;2-3.
(9) Zhu, W.; Zeng, N.; Wang, N. Sensitivity, Specificity, Accuracy, Associated Confidence Interval and ROC Analysis with Practical SAS® Implementations. Northeast SAS Users Gr. 2010 Heal. Care Life Sci. 2010.

The complete disclosure of all patents, patent applications, and publications, and electronically available material cited herein are incorporated by reference in their entirety. Supplementary materials referenced in publications (such as supplementary tables, supplementary figures, supplementary materials and methods, and/or supplementary experimental data) are likewise incorporated by reference in their entirety. In the event that any inconsistency exists between the disclosure of the present application and the disclosure(s) of any document incorporated herein by reference, the disclosure of the present application shall govern. The foregoing detailed description and examples have been given for clarity of understanding only. No unnecessary limitations are to be understood therefrom. The disclosure is not limited to the exact details shown and described, for variations obvious to one skilled in the art will be included within the disclosure defined by the claims.

Unless otherwise indicated, all numbers expressing quantities of components, molecular weights, and so forth used in the specification and claims are to be understood as being modified in all instances by the term "about." Accordingly, unless otherwise indicated to the contrary, the numerical parameters set forth in the specification and claims are approximations that may vary depending upon the desired properties sought to be obtained by the present disclosure. At the very least, and not as an attempt to limit the doctrine of equivalents to the scope of the claims, each numerical parameter should at least be construed in light of the number of reported significant digits and by applying ordinary rounding techniques.

Notwithstanding that the numerical ranges and parameters setting forth the broad scope of the disclosure are approximations, the numerical values set forth in the specific examples are reported as precisely as possible. All numerical values, however, inherently contain a range necessarily resulting from the standard deviation found in their respective testing measurements.

All headings are for the convenience of the reader and should not be used to limit the meaning of the text that follows the heading, unless so specified.

What is claimed is:

1. A method for identifying tumor-derived extracellular vesicles, comprising:
    combining an antibody and a sample under conditions suitable for formation of antigen-antibody complexes,
        wherein the antibody reacts with an extracellular vesicle tumor-specific surface antigen;
    isolating the complexes,
        wherein the complexes comprise enriched tumor-derived extracellular vesicles;
    exposing the tumor-derived extracellular vesicles to a compound that binds beta-sheet structures; and
    determining if there is an increase in binding of the compound to the extracellular vesicles compared to a negative control.
2. The method of claim 1, wherein the antibody is polyclonal.
3. The method of claim 1, wherein the antibody is monoclonal.
4. The method of claim 1, wherein the antibody is immobilized on a surface before the combining.
5. The method of claim 1, wherein the antibody is immobilized on a surface after the combining.
6. The method of claim 1, wherein the sample comprises a liquid biopsy.
7. The method of claim 6, wherein the sample is from a mammal.
8. The method of claim 7, wherein the mammal is a human, and the human is suspected of having a tumor or known to have a tumor.
9. The method of claim 8, wherein the tumor is a solid tumor associated with a malignant cancer chosen from pancreatic cancer, breast cancer, lung cancer, prostate cancer, and colon cancer.
10. The method of claim 1, wherein the extracellular vesicle tumor-specific surface antigen comprises Epithelial cell adhesion molecule (EpCAM).
11. The method of claim 1, wherein the compound that binds beta-sheet structures is Thioflavin T or Congo red.
12. The method of claim 1, wherein the increase in binding compared to the negative control is statistically significant as determined by an unpaired two-tailed t-test.
13. The method of claim 1, wherein the negative control comprises extracellular vesicles produced by a cell line that is not cancerous.
14. The method of claim 1, wherein the negative control comprises extracellular vesicles from a subject that does not have a cancer.

15. The method of claim 1, wherein the binding compared to the positive control is not statistically significant as determined by an unpaired two-tailed t-test.

16. The method of claim 1, wherein the positive control comprises extracellular vesicles produced by a cell line obtained from a malignant tumor.

17. The method of claim 16, wherein the cell line is PANC-1.

18. The method of claim 1, wherein the positive control comprises extracellular vesicles from a subject having a malignant tumor.

19. The method of claim 1, wherein the sample is from a subject, and wherein the increase in binding of the compound to the extracellular vesicles compared to a negative control indicates the subject has pancreatic cancer, breast cancer, lung cancer, prostate cancer, or colon cancer.

20. The method of claim 1, wherein the method further comprises, after the isolating, removing the tumor-derived extracellular vesicles from the complexes to result in a mixture enriched for tumor-derived extracellular vesicles.

* * * * *